US006791695B2

(12) United States Patent
Lindsay et al.

(10) Patent No.: US 6,791,695 B2
(45) Date of Patent: Sep. 14, 2004

(54) SHEAROGRAPHIC IMAGING MACHINE WITH ARCHIVE MEMORY FOR ANIMATION DATA AND AIR HANDLING SYSTEM

(75) Inventors: John Lindsay, Muscatine, IA (US);
Jason Gridley, Walcott, IA (US);
Merle Meier, Muscatine, IA (US);
Andy Turner, Iowa City, IA (US)

(73) Assignee: Bandag Licensing Corporation, Muscatine, IA (US)

( * ) Notice: Subject to any disclaimer, the term of this patent is extended or adjusted under 35 U.S.C. 154(b) by 196 days.

(21) Appl. No.: 09/907,027

(22) Filed: Jul. 17, 2001

(65) Prior Publication Data

US 2001/0040682 A1 Nov. 15, 2001

Related U.S. Application Data

(63) Continuation-in-part of application No. 09/835,598, filed on Apr. 16, 2001, now Pat. No. 6,433,874, which is a continuation of application No. 09/334,311, filed on Jun. 16, 1999, now Pat. No. 6,219,143.

(51) Int. Cl.$^7$ .............................................. G01B 9/02
(52) U.S. Cl. ...................... 356/520; 356/35.5; 356/458
(58) Field of Search ............................. 356/35.5, 457, 356/458, 520; 73/146; 382/236

(56) References Cited

U.S. PATENT DOCUMENTS

| | | |
|---|---|---|
| 4,702,594 A | 10/1987 | Grant |
| 4,887,899 A | 12/1989 | Hung |
| 5,011,280 A | 4/1991 | Hung |
| 5,082,366 A | 1/1992 | Tyson et al. |
| 5,091,776 A | 2/1992 | Tyson |
| 5,094,528 A | 3/1992 | Tyson et al. |
| 5,175,601 A | 12/1992 | Fitts |
| 5,177,796 A | * 1/1993 | Feig et al. .................. 382/236 |
| 5,257,088 A | 10/1993 | Tyson et al. |
| 5,257,089 A | 10/1993 | Stetson |

(List continued on next page.)

FOREIGN PATENT DOCUMENTS

EP    1043578 A2    1/2002

OTHER PUBLICATIONS

Steinbichler, HTClplus non–destructive tire test system.
Papers from Steinbichler website http://www. steinbichler-.com/Tire.htm as of Aug. 17, 1998.
Chau, F.S. et al., "A Real–Time Digital Shearing Speckle Interferometer," *Measurement Science & Technology*, No. 4, pp. 381–383; Apr. 3, 1992.
*Bandag Product Alert*, Bandag Model 7400 Insight™ Casing Analyzer, 1 page, May 2000.

* cited by examiner

*Primary Examiner*—Samuel A. Turner
(74) *Attorney, Agent, or Firm*—Leydig Voit & Mayer, Ltd.

(57) ABSTRACT

The invention relates to an apparatus for performing electronic shearography on a test object, especially a tire or retread tire. The apparatus uses a laser light source to illuminate the test object. An optical element through which electromagnetic radiation is reflected from the test object is transmitted and forms a random interference image. The random interference image can be electronically processed to provide a video animation of the effects of stress on the test object. An archive memory can be provided for retaining the animation data which can be compressed such that it includes only preselected individual shearogram images from the set of sequential shearogram images and less than all of the image data associated therewith. An air handling system can be provided for changing the ambient pressure in a pressure chamber within which the test object is supportable. The air handling system can include a humidity reducing mechanism.

74 Claims, 17 Drawing Sheets

U.S. PATENT DOCUMENTS

| | | |
|---|---|---|
| 5,307,139 A | 4/1994 | Tyson et al. |
| 5,319,445 A | 6/1994 | Fitts |
| 5,341,204 A | 8/1994 | Grant et al. |
| 5,414,512 A | 5/1995 | Grant et al. |
| 5,703,680 A * | 12/1997 | Dunn et al. ................. 356/35.5 |
| 5,786,533 A | 7/1998 | Newman |
| 5,948,976 A | 9/1999 | Newman |
| 6,088,101 A | 7/2000 | Newman |
| 6,089,085 A | 7/2000 | Newman |
| 6,092,414 A | 7/2000 | Newman |
| 6,219,143 B1 * | 4/2001 | Lindsay et al. ............. 356/458 |

SHEAROGRAPHIC IMAGING MACHINE WITH ARCHIVE MEMORY FOR ANIMATION DATA AND AIR HANDLING SYSTEM

CROSS-REFERENCE TO RELATED PATENT APPLICATIONS

This application is a continuation-in-part of U.S. patent application Ser. No. 09/835,598 filed Apr. 16, 2001 now U.S. Pat. No. 6,433,874 which is a continuation of U.S. patent application Ser. No. 09/334,311 filed Jun. 16, 1999 issued as U.S. Pat. No. 6,219,143.

FIELD OF THE INVENTION

The present invention relates generally to the field of nondestructive testing. Specifically, the present invention relates to the technique of electronic shearography.

BACKGROUND OF THE INVENTION

The technique of shearing interferometry, or shearography involves the interference of two laterally displaced images of the same object to form an interference image. Conventional shearographic methods require that a first interference image (or baseline image) be taken while the object is in an unstressed or first stressed condition, and another interference image be taken while the object is in a second stressed condition. Comparison of these two interference images (preferably by methods of image subtraction) reveals information about the strain concentrations and hence the integrity of the object in a single image called a shearogram. In particular, shearography has been shown to be useful to detect strain concentrations and hence defects in vehicle tires, especially retread vehicle tires.

In conventional electronic shearography, interference images are stored in a computer memory and are compared electronically to produce single static shearograms. Because all the data are processed electronically, the results of the analysis can be viewed in "real time". "Real time", as used in the prior art, refers to the ability to view the shearogram nearly instantaneously after the second interference image has been taken.

An apparatus and method for performing electronic shearography is described in U.S. Pat. No. 4,887,899 issued to Hung. The apparatus described in the cited patent produces an interference image by passing light, reflected from the test object, through a birefringent material and a polarizer. The birefringent material, which can be a calcite crystal splits a light ray, reflected from the object, into two rays, and the polarizer makes it possible for light rays reflected from a pair of points to interfere with each other. Thus, each point on the object generates two rays, and the result is an interference image formed by the optical interference of two laterally displaced images of the same object.

Prior to the developments disclosed in the Hung patent, the spatial frequency of the interference image produced in shearographic analysis was relatively high requiring the use of high resolution photographic film to record a useful interference image. The development disclosed in the Hung patent produces an interference image with a relatively low spatial frequency because the effective angles between the interfering rays are small. Therefore, the interference images can be recorded by a video camera, a video camera normally having much less resolving capability than a high density or high resolution photographic film. By storing an interference image of the object in its initial, unstressed condition, and by comparing that interference image, virtually instantaneously, by computer with another interference image taken under a different level of stress, a "real time" image or shearogram of the resultant strains on the object can be observed. Each point on the actual interference image is generated by the interference of light emanating from a pair of distinct points on the object. Therefore, each pixel of the video camera is illuminated by light reflected from those two points. If the overall illumination remains constant, then any variations in the pixel intensity, in the interference image, will be due only to changes in the phase relationship of the two points of light.

When the initial video image of the interference image is stored, an initial intensity for each pixel is recorded, as described above. If differential deformations occur in the object, such deformations will cause changes in the subsequent interference image. In particular, the intensity of a given pixel will change according to change in the phase relationship between the two rays of light, reflected from the two points on the object, which illuminate the pixel. The phase differences can be either positive changes, causing the pixel to become brighter or negative changes, causing the pixel to become darker. Whether the pixel becomes brighter or darker depends on the initial phase relationship and the direction of the change of phase. Due to the cyclic nature of phase interferences, as the deformation of the object continually increases, the intensity at a given pixel may pass through a complete cycle. That is, the intensity of the pixel might increase to a maximum (positive) difference, then return to the original intensity, and then continue to a maximum (negative) difference, and so on.

In systems of the prior art, a single shearogram is derived from two single static interference images taken at two distinct stress levels. The single shearogram is then viewed by an operator for analysis if multiple shearograms are taken, the analysis is done one shearogram at a time. Thus, the operator attendance time, required to perform a thorough stress analysis, is substantial. Further, a single shearogram may falsely show light features that appear to be defects (referred to as "false positives"). These "false positives" are caused by different reflective characteristics on the surface of the test object and appear as defects when a static shearogram is viewed. Further still, in a static shearogram some real defects may be "washed out" and thus not visible (referred to as "false negatives"), at certain (particularly high) stress levels. These "washed out" effects are caused by shearographic fringe lines that are not spatially separated enough to be visibly distinguishable and therefore appear to be aberrational light effects rather than real defects in the test object. Thus, a single static shearogram may contain inaccurate information with regards to the defects actually present. Furthermore, an operator having to analyze a large number of shearograms requires a large amount of operator attendance time.

SUMMARY OF THE INVENTION

The present invention relates to an apparatus for performing electronic shearography on a test object such as a tire. The shearography testing apparatus of the present invention can include a tire handling system which loads a tire and automatically centers it relative to the shearography camera. The tire handling system also utilizes a pivotal loading motion that eases the loading of tires and minimizes the required floor space.

The shearography testing apparatus of the present invention can also include a vacuum chamber having an air handling system which can reduce the relative humidity in the interior of the vacuum chamber during a test cycle. This can prevent the formation of a fog-like condition in the vacuum chamber which could substantially reduce the quality of the interference images taken by the shearography camera.

Another aspect of the present invention can comprise a system and method for archiving the animated images created during shearography testing so that they can be reviewed at a later time. The animated image data is compressed prior to storage on the archive medium in such a manner to allow for more efficient storage of the test results without significant degradation of the image quality. Thus, the data can be archived in a more cost efficient manner without sacrificing any loss of accuracy in the test results.

These and other advantages of the invention, as well as additional inventive features, will be apparent from the description of the invention provided herein.

BRIEF DESCRIPTION OF THE DRAWINGS

The invention will hereafter be described with reference to the accompanying drawings, wherein like reference numerals denote like elements in the various drawings, and.

DETAILED DESCRIPTION OF EXEMPLARY EMBODIMENTS

The present invention utilizes basic concepts of electronic shearography. More details of electronic shearography are given in U.S. Pat. No. 4,887,899, the disclosure of which is incorporated by reference herein.

Figure 1:
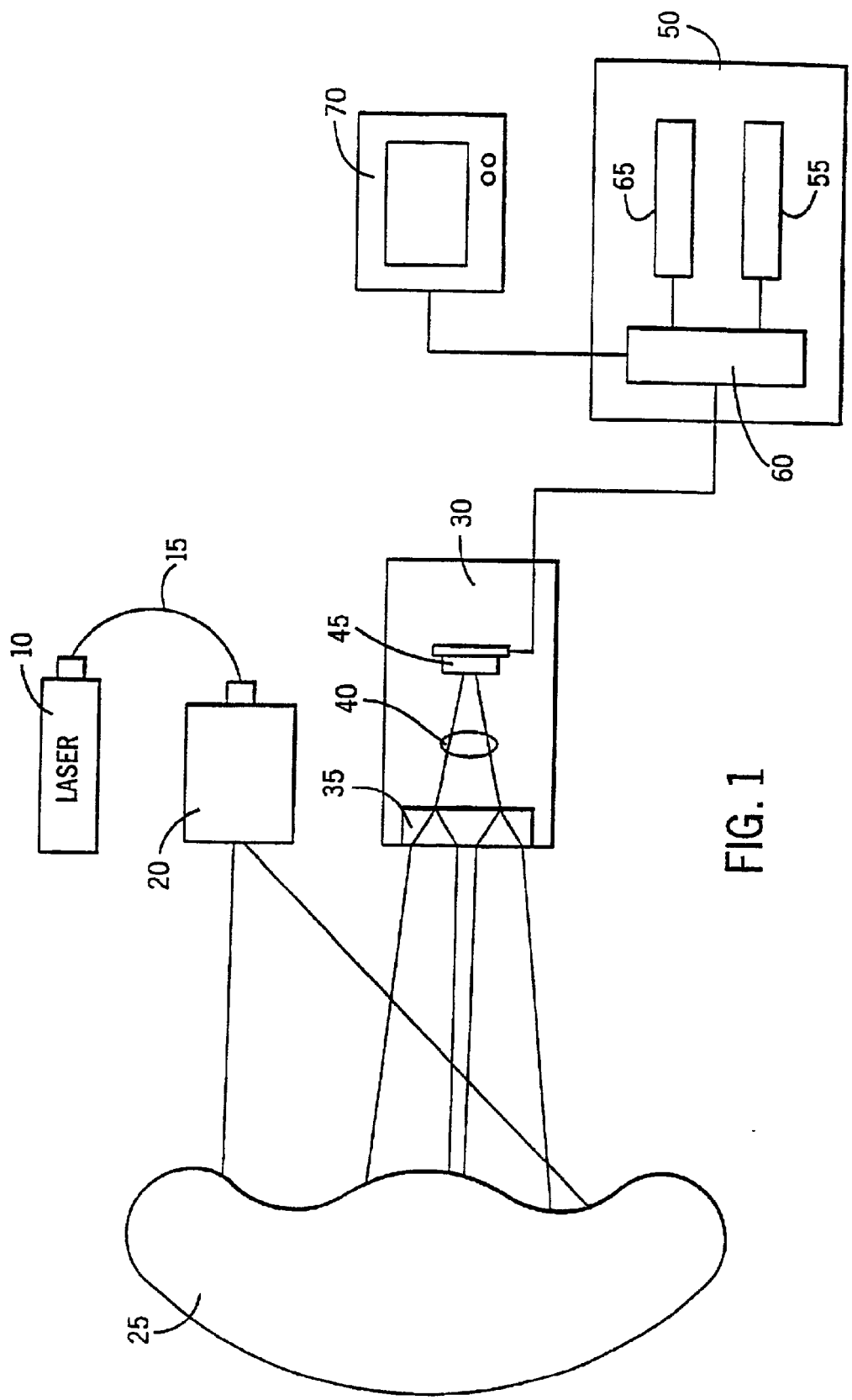
FIG. 1 is a schematic block diagram of a shearographic imaging system.

Referring now to FIG. 1, a schematic block diagram of an arrangement for practicing electronic shearography is depicted. Coherent electromagnetic radiation or coherent light is produced by a laser 10, the laser light being directed through a fiberoptic cable 15 (or alternatively directed by a mirror or a set of mirrors or provided directly) to a beam expander or illuminator 20. Beam expander 20 directs the coherent light onto a test object 25. The surface of test object 25 is illuminated and reflects light into a shearography camera 30. Shearography camera 30 includes an optical element 35, a lens 40 for focusing the light, and a detector 45. Optical element 35 may be a birefringent material and a polarizer, the birefringent material being a calcite material such as a Wallestein prism. The optical element is however not limited to a birefringent material and a polarizer, other elements such as a defraction grating, a Mickelson mirror, or an appropriate wave plate may be applied. Further, optical element 35 may contain other optics, such as, but not limited to a quarter-wave plate. Detector 45 may be a traditional video camera, a digital video camera, a charge coupled device (CCD), or other photo sensitive detection equipment.

The output of detector 45 is coupled to an animation device such as a computer 50. Computer 50 includes a video capture circuit 55, a central processing unit 60, and a memory 65. Alternatively, computer 50 may include a logical extractor that is configured to extract shearographic images from memory in a predetermined manner. The logical extractor may be embodied in hardware or alternatively in software within computer 50. Video capture circuit 55 may be a dedicated video card or a frame grabber preferably capable of capturing entire video images at a rate of at least 15 frames per second. However, video capture circuit 55 may be capable of capturing video images at any suitable rate. Central processing unit 60 may be any of a number of conventional microprocessors or a dedicated microprocessor device. Detector 45 is coupled to central processing unit 60, central processing unit 60 being coupled to video capture circuit 55 and memory device 65. Central processing unit 60 is further coupled to a display unit 70, which may be a CRT (cathode ray tube) display, an LCD (liquid crystal display), or the like.

In operation, coherent light emanating from beam expander 20 is reflected from test object 25. Optical element 35 collects the reflected light from object 25 causing an interference image to be created. The interference image is focused on detector 45 through lens 40. Conventionally, a first interference image is taken while test object 25 is in a first stressed condition, and a second interference image is taken with object 25 in a second stressed condition. The two interference images are then compared by a process of differencing one image with respect to the other and the shearogram is created and displayed on a monitor.

In the present invention, test object 25 undergoes a sequence of or continuum of varying stress levels. Detector 45 continuously captures the interference image from optical element 35 and communicates the interference image to computer 50, during the stress cycle. Capture circuit 55 electronically captures entire interference images at a rate of at least 15 frames per second. Capture circuit 55 communicates the interference images to central processing unit 60. Central processing unit 60 compares the interference image to a baseline interference image of the object in the unstressed or near unstressed state (or alternatively any chosen stress state), by a process of differencing one interference image from the baseline interference image, thereby forming a shearogram. Each shearogram image is simultaneously displayed on display unit 70 and stored in memory device 65. After the series of varying stress levels has been completed, microprocessor 60 (or alternatively a logical extractor) recalls the sequence of shearogram images captured by capture circuit 55 and replays them in sequence on display unit 70. The sequential display of these shearogram images, at a rate of at least 15 frames per second, produces a shearographic animation of the shearograms produced during or after stressing of test object 25.

Figure 2:
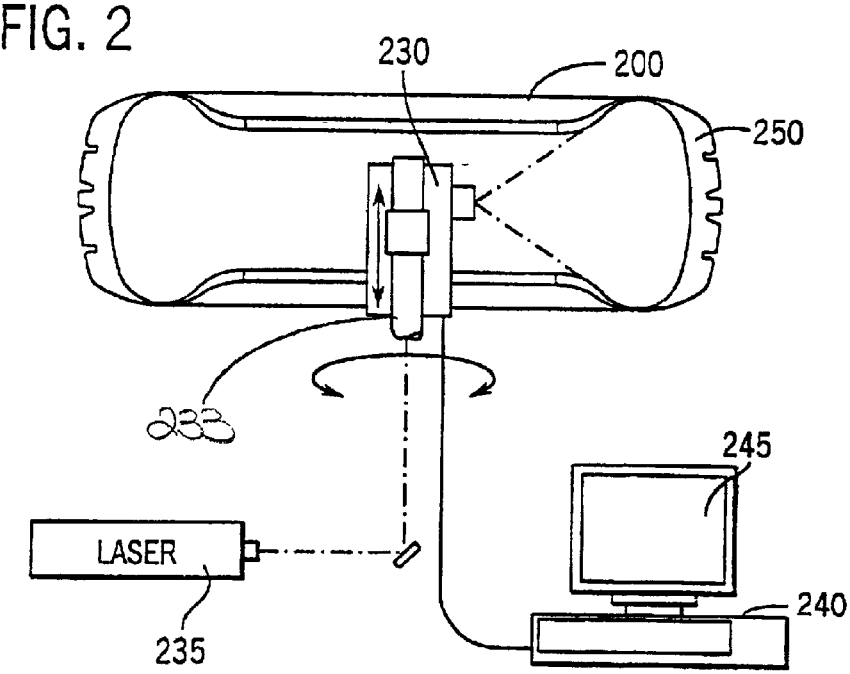
FIG. 2 is a schematic diagram of a shearographic imaging system showing a cross-section of a tire as the test object.

Test object 25 may be a relatively large object, such as a tire 200, as depicted in FIG. 2. A shearographic camera 230 that is rotatable within the inside of the bead 202 of tire 200 is depicted in FIG. 2. (Alternatively, tire 200 may be rotated and camera 230 may be stationary.) Shearographic camera 230 includes a laser 235 producing a coherent beam of light to illuminate the inside of tire 200. Shearographic camera 235 is further coupled to a computer 240 having a display 245, computer 240 and display 245 being used for data acquisition and animation of the resultant shearographic images.

Figure 3:
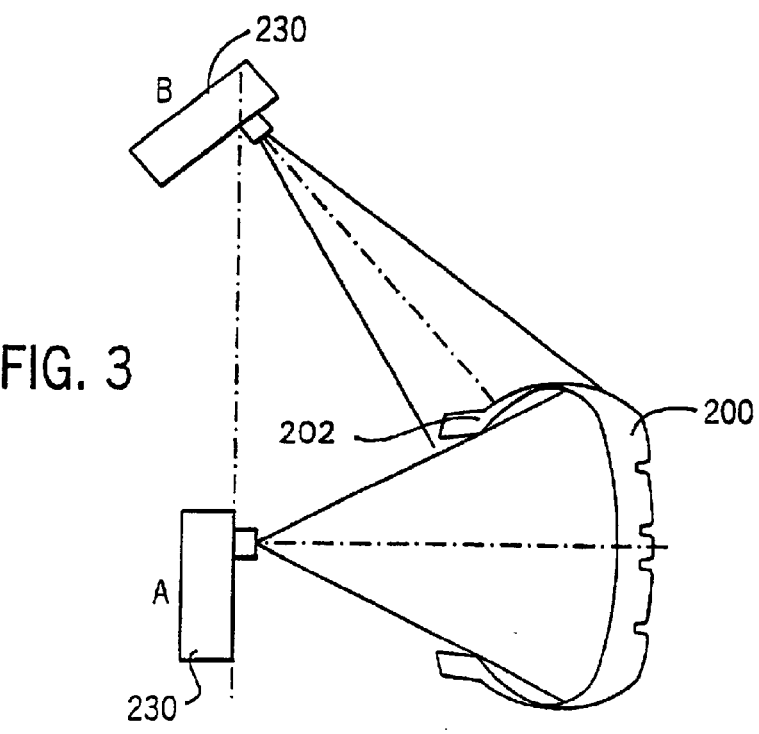
FIG. 3 is a schematic diagram of a shearographic camera at two different orientations relative to the tire.

When used for detection of defects in tires or retread tires, shearographic imaging camera 230 may be positioned inside the tire depicted as position A in FIG. 3 or outside the tire as depicted in FIG. 3 by position B. Having shearographic camera 230 in position A allows for detection of defects in the tread area of tire 200. Having shearographic camera 230 in position B provides for examination of the bead area and side wall area of tire 200.

Figure 4:
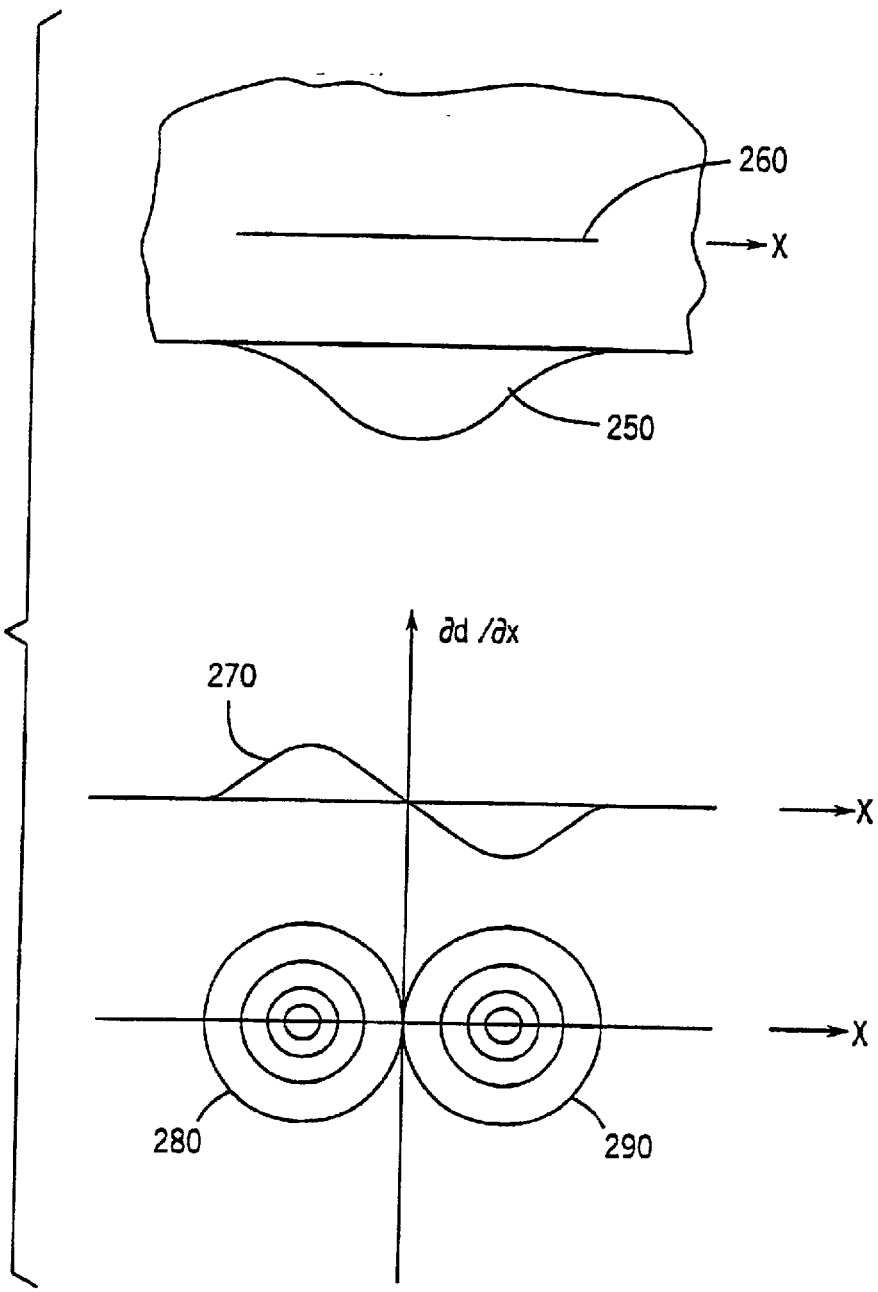
FIG. 4 is a graphical representation of the deformation of a test object, showing the corresponding shearographic fringe pattern produced.

Referring back to FIG. 2, in operation, shearographic camera 230 and tire 200 may be placed into a vacuum chamber capable of subjecting tire 200 to a vacuum producing stresses on tire 200 by producing a positive pressure (relative to the pressure inside the vacuum chamber) in voids within tire 200 causing a bulge 250. Referring to FIG. 4, the bulge may be caused by a defect 260, defect 260 possibly being but not limited to a delamination between two layers of the tire or a void in the molded material. When subjected to a vacuum, bulge 250 appears because of positive pressure within the void space of bond 260. The graph of FIG. 4 depicts the slope of bulge 250 by line 270. The graph of FIG. 4 further depicts a fringe pattern, including groups of rings 280 and 290, produced by the differencing of two optical interference images produced by shearographic camera 230. Fringe patterns 280 and 290 of a shearogram image is produced by computer 240 (by the method of differencing or by any other image resolving technique) appear as a set of roughly concentric, substantially circular fringe lines corresponding to slope 270 of bulge 250. Fringe patterns 280 and 290 are a contour mapping of the absolute value of slope 270 of bulge 250. Therefore, because bulge 250 is substantially symmetric, fringe patterns 280 and 290 appear to be mirror images of each other.

Referring back to FIG. 2, in operation, shearographic camera 230 takes a series of interference images that are communicated to computer 240 while tire 200 undergoes varying vacuum or stress cycle. In a preferred embodiment tire 200 undergoes a depressurization cycle and then a pressurization cycle to return the tire to an unstressed state. Because the field of view of shearographic camera 230 is limited by the field of view of the optical elements and by the size of the tire, a tire must be sectioned into a number of sectors ranging from four to twelve, or more. In an exemplary embodiment, tire 200 is sectioned into nine different sectors. Shearographic camera 230 therefore views an area corresponding to 40° of arc of tire 200. After the depressurization and pressurization cycle, camera 230 is rotated to the next sector, there the depressurization and pressurization cycle is repeated. Computer 240 continues to collect data and may, in a preferred embodiment, simultaneously display data on display 245 throughout the entirety of the nine sector cycle. The shearograms are generated and displayed at a rate such that they appear to be animated.

Figure 5:
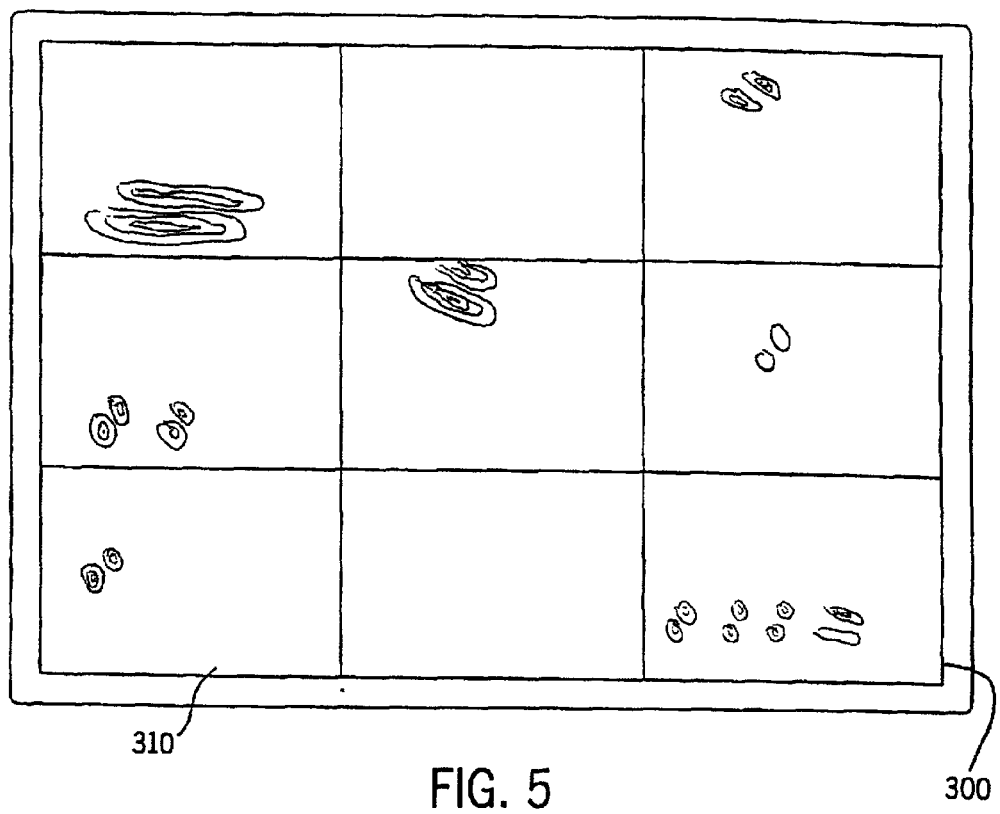
FIG. 5 is a schematic diagram of an exemplary display for simultaneously displaying a plurality of shearographic animations.

Referring now to FIG. 5, a display 300 is depicted, the display being divided into nine different sectors, each sector 310 corresponding to an approximate 40° arc of the inside of a tire. Alternatively, however, each sector 310 could correspond to any specific field of view, of a tire, for a shearographic camera, such as shearographic camera 230. Computer 240 as depicted in FIG. 2, which may be connected to display 300, is capable of displaying a plurality of animations simultaneously as depicted in FIG. 5. FIG. 5 depicts a static screen shot of a typical display, however, display 300 actually shows animations or sequential imaging of shearogram images produced by computer 240 at a rate providing an animated effect and in a preferred embodiment at a rate of 30 frames per second. A display having multiple animation windows or screen sectors provides the clear advantage that an operator may observe the animations simultaneously looking for the appearance of indications of deformations due to defects. This simultaneous observation permits less attendance time by an operator, therefore providing substantial time savings without substantial loss of accuracy. Capturing and providing animation preferably at 30 frames per second (or alternatively any suitable animation rate) provides animations that are sufficiently smooth to be useful to an operator.

The advantages of animating the sequence of images is that animation improves accuracy in the detection of defects. Light effects that would appear as "false positives" in a static shearogram are not manifested as defects when animated, due to the absence of apparent motion induced by the animation. A fringe pattern caused by a real defect will tend to "grow" or "shrink" and the intensity of fringe lines will appear to cycle during the animation, due to the continually changing stress state on the test object. Furthermore, real defects that may be "washed out" in a static shearogram or even in an integration of multiple shearographic images, become apparent with animation of the shearographic images.

Animation of the shearographic images allows visualization of defects at a multiplicity of stress states, some of the stress states may not cause the "washed out" effect and further the apparent motion created by animation of the images manifests a real defect as opposed to the light effect. Animation of the shearograms goes through a substantial continuity of stress states, therefore defects that may not be present at two chosen stress states become apparent in the animation. These advantages in animation of the shearographic images provide better accuracy in detecting defects and provides for shorter analysis times by an operator.

It has been recognized that a number of signal processing techniques, such as, but not limited to the use of fuzzy logic, neural networks, artificial intelligence, and pattern recognition techniques, may be applied to perform automatic defect identification. However, systems such as this tend to be inherently complex and substantially costly. Therefore, retaining a human operator, but cutting down on the operators' required attendance time by providing the operator with numerous simultaneous animations, has the effect of providing substantial cost savings.

Although animation of shearographic images may be preferable at a rate of at least 15 frames per second, it should be noted that frame rates of less than 15 frames per second may also be used effectively, however the animation may appear discretized as compared to an animation running at least 15 frames per second. Further, it should be appreciated that frame rates of more than 30 frames per second may be advantageous in specific applications and may become simpler to implement as microprocessor and video capture technology is improved.

It should be appreciated that although a differencing approach to producing each shearogram is described above, the methods and apparatuses disclosed may be applied to different image resolving techniques, including but not limited to continuous integration. Continuous integration describes the process of taking a first interference image and differencing a second interference image to produce a first shearogram. A third interference image is taken and subtracted from the first shearogram to produce a second shearogram. A fourth interference image is then taken and subtracted from the second shearogram to produce a third shearogram. This sequence is continued throughout the testing cycle. The continuous integration technique and other techniques known to those of ordinary skill in the art, lend themselves to the animation techniques disclosed above and can be applied thereto without departing from the spirit and scope of the present invention.

The process and apparatus described above should be appreciated to optimize a number of competing factors associated with shearographic imaging, especially as applied to the testing for defects in retread tires (although clearly not limited to this application). These competing factors include, but are not limited to, maximizing data, maximizing accuracy, minimizing operator attendance time, available light wavelengths, object size, equipment costs, and optical field of view. By animating shearograms in a plurality of sectors on a display screen, a number of these competing factors are optimized.

The shearogram image data collected can be archived, to allow the same tire image data used by the operator to evaluate the tire during the shearography testing to be reviewed at a later date. The capability of archiving the image data can provide several advantages including permitting a decision with respect to the presence of defects in a certain tire to be re-evaluated at a later date such as during the investigation of a potential warranty issue. Additionally, the archived tire data can be used to evaluate the condition of a particular tire over time when the tire is tested multiple times.

The advantages associated with animating the sequence of images during the original evaluation of the tire are equally applicable to the review of the archived image data. Moreover, to fairly and accurately reevaluate a decision with respect to a particular tire in, for example, a warranty situation, the archived data should be substantially the same as the data that was reviewed during the original evaluation. Thus, the animation of the images preferably should be part of the archived record.

However, storing the animated images can require an enormous amount of memory space. For example, in one embodiment of the invention, the raw data collected for each tire can comprise about 250 MB of information in the form of animated pictures which can substantially limit the number of test results that can be stored on a given storage medium. Accordingly, in the present invention, the archiving feature can be adapted such that prior to storage, the data is compressed so as to allow for more efficient storage of the test results. For example in an exemplary embodiment, during a test, all of the shearogram image data that is produced is stored in the shear computer's memory such as in the computer's RAM. As explained above, this data can be displayed in the form of animations to allow analysis of the test object for possible defects by an operator. This data also can be transferred to an archive memory, for example a hard disk, a CD-ROM or a magnetic tape, where the data can be stored on a long-term basis. Prior to such long-term storage, the data is compressed so that a substantially larger number of test results can be stored on a given storage medium. Thus, the cost of storing data and the cost of calling up the stored data is reduced. As explained below, the data is compressed in such a manner that the test results can be stored efficiently without significant degradation in the image quality thereby allowing the test results to be reviewed at a later time without any loss of accuracy in detecting defects.

Figure 6:
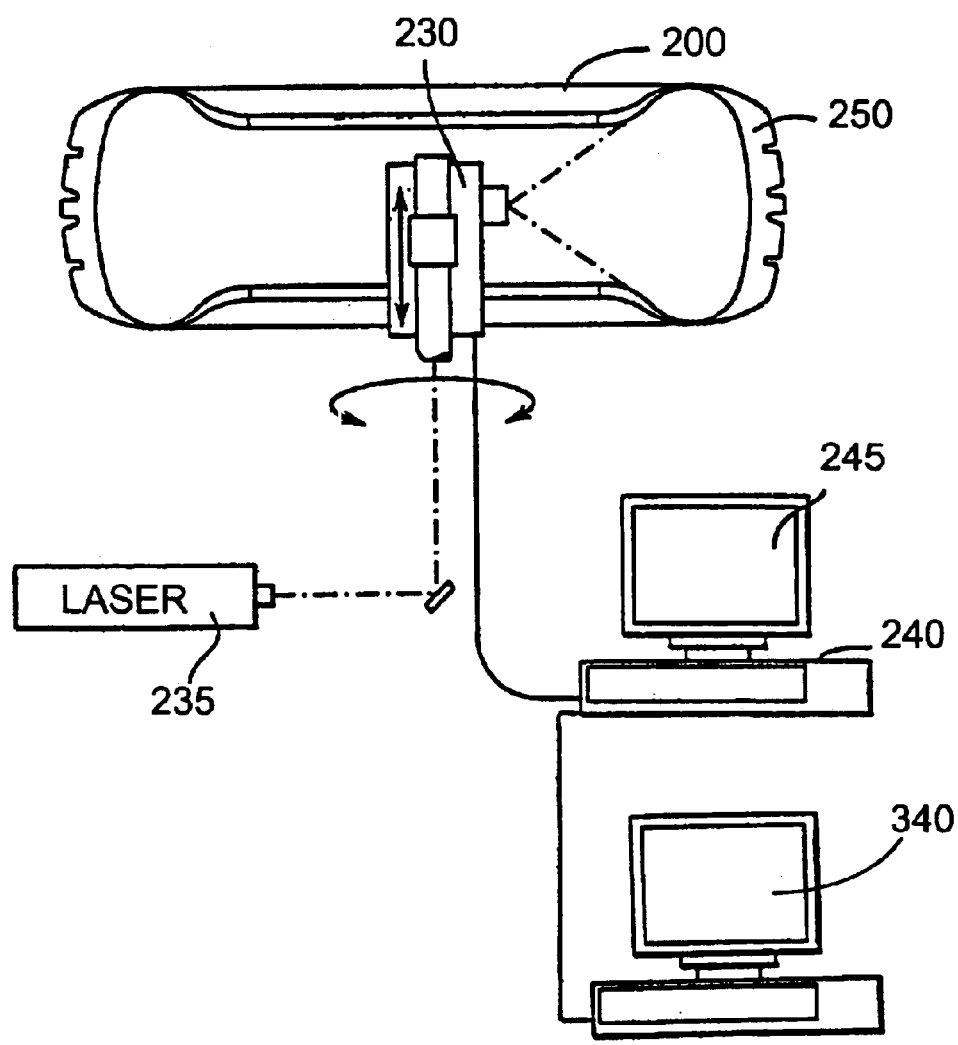
FIG. 6 is a schematic diagram of an exemplary shearographic imaging system adapted to archive the test data in accordance with one aspect of the invention.
Figure 7:
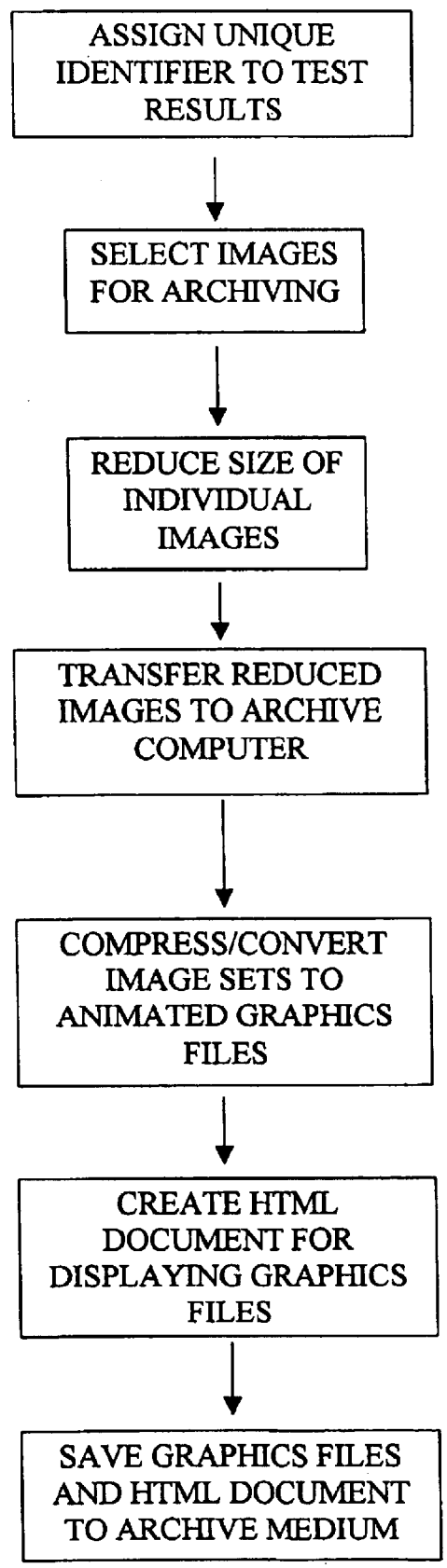
FIG. 7 is a flow chart of an exemplary archiving process in accordance with one aspect of the invention.

In an exemplary embodiment, to implement data archiving, an archiving computer 340 is provided which is in communication with the shear computer via a parallel cable or the like as shown, for example, in FIG. 6. Additionally, the software in the shear computer, such as for example the boot software and the hardware support software, is modified to support transfer of data to the archive computer. Once all of the data has been collected by the shear computer, the archiving process can be initiated. A flow chart illustrating an exemplary set of steps to be performed in the archiving process is shown in FIG. 7 and described below. As will be appreciated, these steps do not have to be performed in the sequence illustrated. Moreover, the individual steps can be performed by the shearography computer 240, the archive computer 340 or any other suitable processor. For example, both the image processing, compression and retaining of the data could be performed by a single computer or processor. As noted above, the memory in which the data is archived can be any suitable memory in which data can be stored including, for example, the hard disk drive of the shearography computer, archive computer or other computer, a floppy disk loaded into an external floppy disk drive associated with the shearography computer, archive computer or other computer, a CD-ROM loaded into a CD-ROM drive associated with the shearography computer, archive computer or other computer or a magnetic tape loaded into a tape drive associated with the shearography computer, archive computer or other computer.

To associate the tire (or other test object) which was tested with its corresponding specific test result within the archive database, a unique identifier can be entered once all of the data is collected by the shear computer 240. In the exemplary embodiment, this is accomplished by switching the display screen to an operator interface which is run by the archiving computer 340. Through the interface, the operator is prompted to enter a unique identifier for the tire which was tested. To ensure that a unique identifier is entered by the operator, the interface program can be adapted such that the test results collected for a tire will not be displayed until the identifier is entered. In other words, the operator interface will remain on the display until an appropriate identifier is entered for the tire. Once a tire identifier has been entered, the display can be switched back to the shear computer to display the animated shearogram images from the just completed test cycle. The tire identifier can be entered via any suitable input device including for example a keyboard or a bar code reader.

The operator interface program can also allow for the entry of other information regarding the tire such as for example a customer identification or notes. The entry of the other information can be made optional such that entry of the tire identifier is the only operator step necessary to implement the data archiving process. The operator interface can also display other information regarding the archiving process such as for example, a list of archived files and a status of the amount of storage capacity used.

Prior to transfer of the data to the archiving computer 340, it can be beneficial to cull the raw image data in order to reduce the number of images that must be transferred to the archiving computer. In particular, applicants have found that when a significant number of shearogram images are collected during a testing cycle there is not any appreciable loss in the animation quality if only selected images from the animation sequence are played at a relatively slower rate. For example, in one embodiment of the invention, twenty-eight shearogram images are collected for each section of the tire. During analysis by the operator, these images are played at a rate of about 60 frames per second. However, there is not any appreciable difference in the animation quality if only every third image of the twenty-eight image sequence is displayed at a rate of about 20 frames per second. Thus, storing only ten of the twenty-eight images for that particular section can produce an accurate record of the test.

Once the images to be transferred to the archiving computer are selected, an initial compression sequence can be performed, in this case, by the shear computer 240. In this initial compression sequence, the individual images of the animation sequence that are to be transferred to the archive computer 340 can be reduced in size. In one embodiment, the image bitmaps stored in the shear computer are 512 pixels wide, 480 pixels tall and have eight bits per pixel. Each image bitmap to be transferred to the archive computer 340 can be reduced in size 9:1 to 172 pixels wide and 160 pixels tall using the data from every third column and every third row of the bitmap. To help ensure that the archived image looks as close as possible to the original image, a pixel averaging technique can be used to reduce the size of the image. With the pixel averaging technique, a single pixel is created that it is the average of the original pixel and the eight pixels which surrounded the original pixel in the original image. For pixels at the edge of the bitmap, the average of the original pixel and the five surrounding pixels is used. This has the effect of smoothing the data, reducing noise in the image. After the image is reduced, a header is added to the image to instruct an image viewer how to display the image.

To initiate transfer of the reduced images from the shear computer 240 to the archiving computer 340, communication is established between the two computers. This can be implemented by suitable software. In the exemplary embodiment, at the conclusion of the data collection process, the shear computer 240 sends a message to the archiving computer 340 containing a file name for the image data. Optionally, the message can also include a scale for creating a grid on the crown view within the archived data associated with the tire. Once the file name message is received, the archiving computer 340 creates a working directory in the root of the drive in which the transferred images will be placed. Next, a text file is created in that directory with a single line saying the file name. The archiving computer 340 then responds to the shear computer 240 with the same file name originally sent by the shear computer. This response signals the shear computer 240 to transfer the files containing the reduced images. The transfer process does not begin until the archiving computer 340 sends the appropriate file name response. As each file is transferred, it is stored in the working directory created by the archiving computer 340. The reduced images can be transferred to the archiving computer in a ".BMP" format.

After all of the image files have been transferred to the archiving computer 340, the archiving computer further compresses the data. This can be done by converting the image sets for each of the tire sections into an animated graphics file, for example, a GIF file. The standard GIF compression includes a built-in transparency feature which allows one of the colors to be made transparent. In the context of an animation, the transparent color is used when a pixel in a frame of the animation is the same as in the preceding frame. Thus, the first frame of the animated GIF file has the full image data. However, the succeeding frames may use the transparency bit which tells the display program to not change the color of the pixel being displayed. This significantly increases the compression ratio by creating more repeating patterns. Additional details regarding GIF files and compression can be found in the Graphic Interchange Form Programming Reference published by CompuServe Inc. and dated Jul. 31, 1990.

The compression provided by the standard GIF compression can be further enhanced by modifying the transparency feature so as to produce a lossy compression. Specifically, applicants have found that in a shearography animation it can be difficult to discern between pixel values which change only a relatively small amount in intensity from one frame to the next. Thus, these pixels can be assigned the transparent color without any substantial degradation of the animation quality. Specifically, in the input stream feeding the compression engine, the pixel being displayed is constantly being compared to the pixel which is to replace it in the succeeding frame so that transparent pixels can be generated. According to one aspect of the present invention, the generation of the transparent pixels is altered by assigning the transparent color to pixels in a frame of the animation which have not changed by more than a predetermined level from the preceding frame as opposed to only those pixels that are identical. Thus, transparent pixels are much more likely to be generated.

GIF compression utilizes the LZW compression technique which creates "tokens" that represent longer repeating sequences of bytes. These tokens are created as the compression is taking place. The use of a tolerance with regard to the generation of the transparent pixels increases the likelihood of longer strings in the tokens, thereby providing greater compression. The decoder program for the animations simply skips past the pixels which have the transparent value, leaving the same color displayed.

For example, when using a 0–255 light to dark scale, the trigger for assigning a transparent pixel can be set where the brightness level has not changed by more than 8 counts from the displayed brightness. With such a trigger, if the displayed pixel from the first frame of the animation has a brightness level of 10 and the corresponding pixel in the second frame has a brightness level of 17, the transparent pixel value (e.g., 252) would be assigned to that pixel in the second frame. If in the third frame, the corresponding pixel has a brightness level of 24, the transparent pixel value would not be assigned so that the new pixel value of 24 would be saved and later displayed. Using the 0–225 light to dark scale, applicants have found that changes in brightness of less than 16 levels are difficult for the human eye to visually discern. Thus, the compression algorithm of the present invention could, for example, utilize any brightness level of 16 or less as the trigger for assigning the transparent pixel value during the compression. As will be appreciated, if other scales are used for pixel values, in keeping with the invention, a trigger should be selected that reflects a change that is not discernable by the human eye. Thus, the compression algorithm is not limited to any particular trigger value for assigning the transparent pixel value, but instead can encompass any value which represents a change in the image which is difficult for the human eye to discern.

At the end of the compression process performed by the archiving computer 340, a series of animated GIF files each of the which can correspond to a particular section of the tire being tested (or other test object) are saved to the archive storage medium in a directory or subdirectory corresponding to the particular file name. To allow for display of the animated GIF files, an HTML document is created which allows the GIF files to be displayed in any internet browser. The HTML document also can contain the tire identifier, the customer name, any notes entered by the operator, the date and time. This HTML document can also be saved using the file name and be placed with the GIF files on the archive storage medium. An index HTML document is also updated with the file name, tire identifier and any other desired information so as to allow searches for the test results to be performed. For example, a search function could be provided through the operator interface. Once this is completed, the work directory which contained the original files transferred from the shear computer can be removed.

Figure 8:
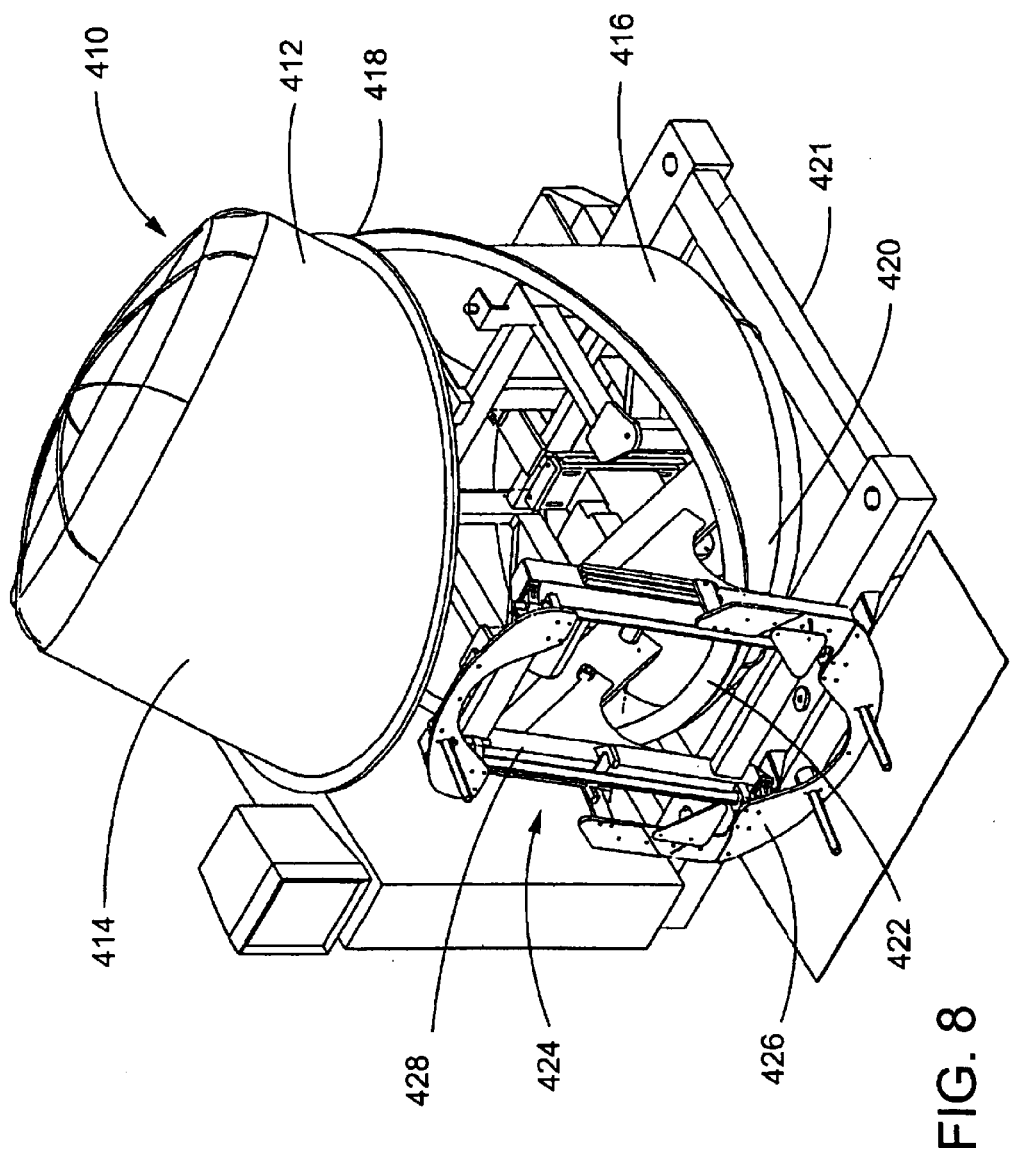
FIG. 8 is a perspective view of an exemplary shearography testing apparatus according to another aspect of the present invention with the vacuum chamber in an open position and the tire handling system in the loading position.
Figure 9:
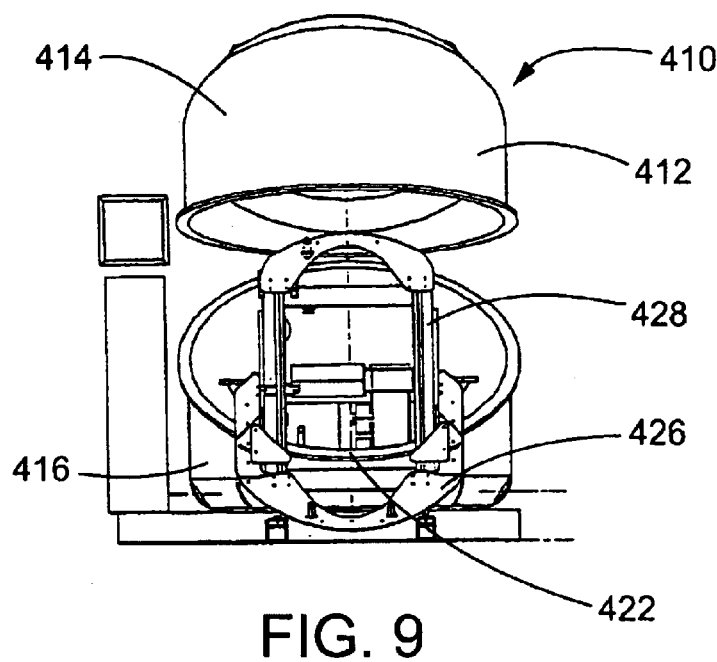
FIG. 9 is a front elevation view of the shearography testing apparatus of FIG. 8 with the vacuum chamber in an open position and the tire handling system in the loading position.
Figure 10:
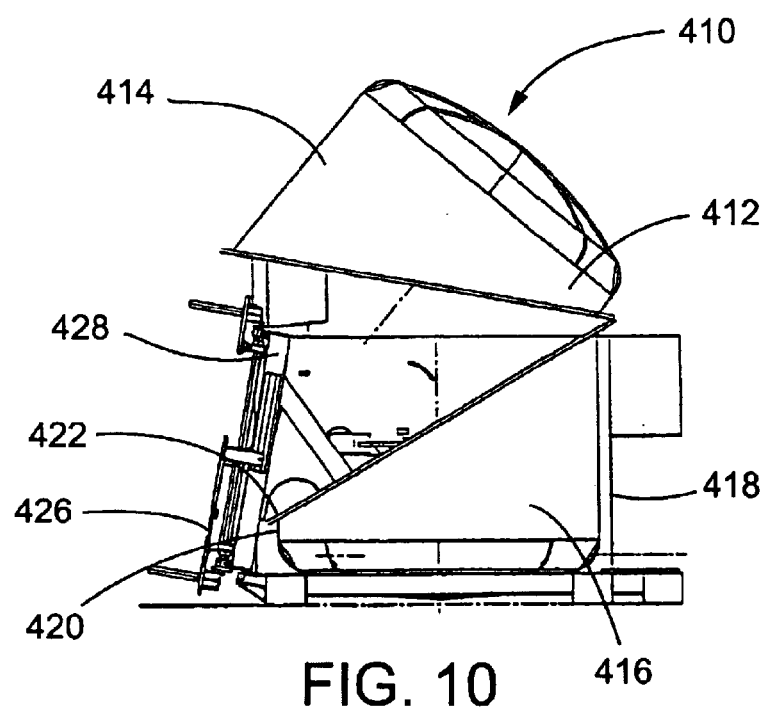
FIG. 10 is a side elevation view of the shearography testing apparatus of FIG. 8 with the vacuum chamber in an open position and the tire handling system in the loading position.
Figure 11:
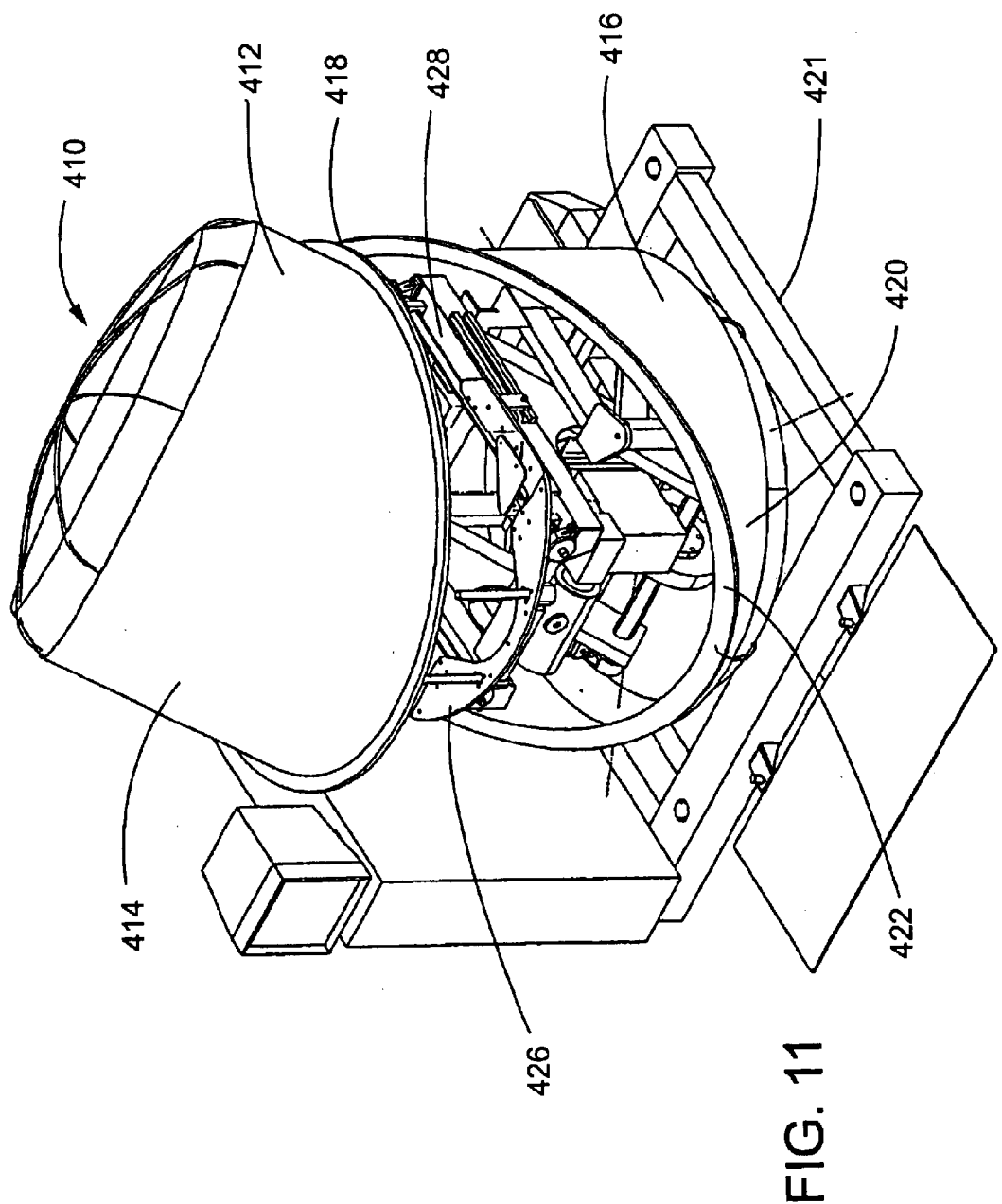
FIG. 11 is a perspective view of the shearography testing apparatus of FIG. 8 with the vacuum chamber in an open position and the tire handling system in the inspection position.

Referring now to FIGS. 8–20 of the drawings, there is shown an illustrative apparatus 410 for conducting shearography testing on a vehicle tire. It will be understood that while the illustrated shearography test apparatus 410 can be used to produce animated shearographic images of a tire, the apparatus is not limited to performing tests which produce animations. Instead, the shearography testing apparatus 410 can be configured to perform any desired method of shearographic testing. As shown in FIGS. 8–13, the shearography testing apparatus 410 includes a vacuum chamber 412 into which a tire can be loaded and subjected to a vacuum test cycle (i.e., depressurization and pressurization). In the illustrated embodiment, the vacuum chamber 412 has a generally cylindrical configuration which is divided into upper and lower portions 414, 416. As best shown in FIGS. 8 and 11, the upper and lower portions 414, 416 are pivotally connected together along a rear portion 418 of the vacuum chamber 410 such that, in this instance, the upper portion 414 is movable relative to the lower portion 416 between open and closed positions. The separation of the vacuum chamber 412 into the upper and lower portions 414, 416 is along an angle relative to the base 421 of the vacuum chamber. Specifically, the vacuum chamber 412 is divided into the upper and lower portions 414, 416 along a plane that angles downwardly as it extends from the rear 418 to the front 420 of the vacuum chamber. Accordingly, when the upper portion 414 is in the open position, the upper and lower portions 414, 416 define an open mouth having a relatively low front lip 422. This low front lip 422 facilitates the loading and unloading of tires as described below.

For taking interference images of the tire during the vacuum cycle, a shearography camera assembly is provided. The camera assembly, which is schematically shown in FIG. 2, includes a shearographic camera 230 and a laser 235 for illuminating the tire with a coherent beam of light. The shearographic camera 230 is supported on a mast 233 that is arranged in centered relation relative to the vacuum chamber 412. The mast 233 is extendable along the center axis of the vacuum chamber 412 to allow the camera 230 to be positioned in the interior of the tire for examining the tread area and outside the tire for examining the bead and side wall of the tire. Additionally, the mast 233 is rotatable so that the camera 230 can be positioned to view the different sections or sectors of the tire. As described above, after each vacuum cycle, the camera 230 is rotated to view the next tire sector and the vacuum cycle is repeated.

Figure 12:
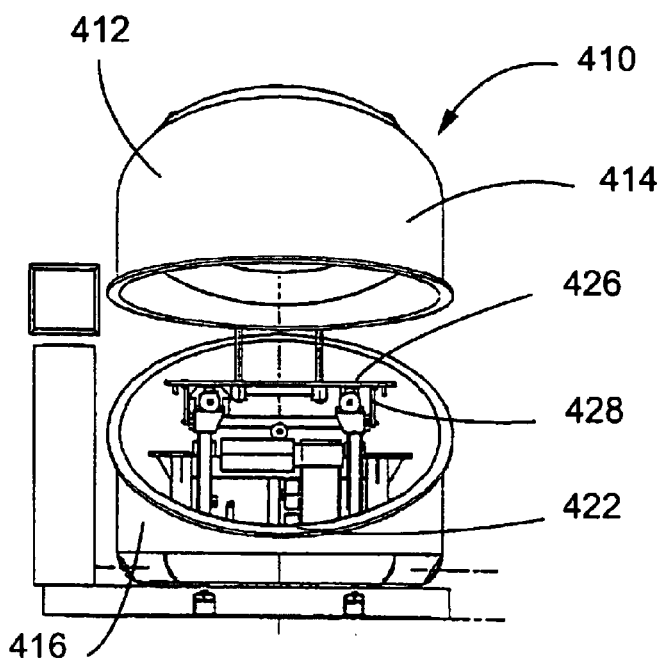
FIG. 12 is a front elevation view of the shearography testing apparatus of FIG. 8 with the vacuum chamber in an open position and the tire handling system in the inspection position.
Figure 13:
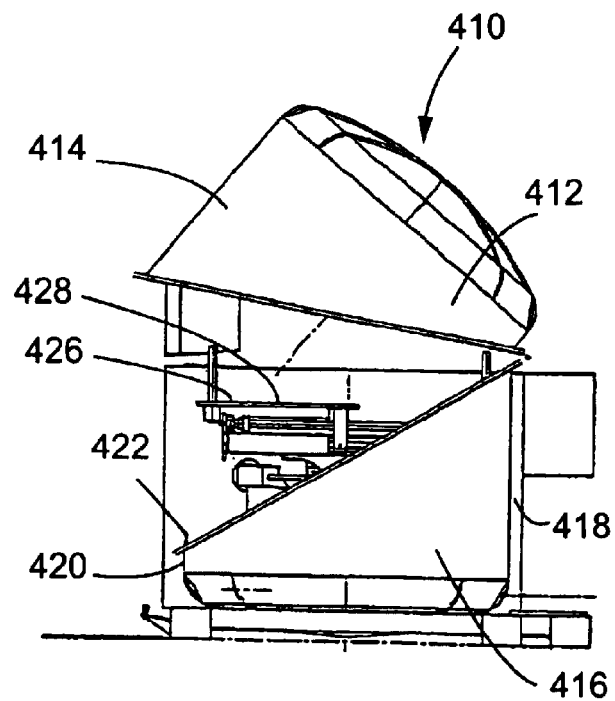
FIG. 13 is a side elevation view of the shearography testing apparatus of FIG. 8 with the vacuum chamber in an open position and the tire handling system in the inspection position.

The illustrated shearography testing apparatus 410 further includes a tire handling system which loads a tire into the vacuum chamber 412 and automatically centers the tire relative to the chamber and, in turn, the shearography camera. Specifically, the tire handling system provides a simple mechanical centering mechanism which reliably and accurately centers tires of different diameter without the need for any adjustments by an operator. Moreover, the tire handling system utilizes a pivotal loading assembly 424 that minimizes the floor space requirements for the loading/unloading operation and substantially eases the loading/unloading process by allowing a tire to be loaded and unloaded in a substantially vertical position. To this end, the pivotal loading assembly 424 includes a tire support plate 426 that is movable between a loading position and an inspection position when the vacuum chamber 412 is in the open position. In the loading position, the tire support plate 426 is arranged in substantially outside and in front of the vacuum chamber 412. Additionally, the tire support plate 426 extends at a slight angle from vertical toward the rear 418 of the vacuum chamber 412 with a lower end 446 of the support plate being arranged generally in front of the lower front lip 422 of the vacuum chamber mouth as shown in FIGS. 8–10. In the inspection position, the tire support plate 426 is arranged horizontally inside the vacuum chamber 412 and centered relative to the chamber (and, in turn, the shearography camera) as shown in FIGS. 11–13. The support plate 426 is configured such that its center portion is substantially open so that, when the plate is in the inspection position, the camera can view the bottom bead of the tire supported thereon without the need for any additional tire handling.

Figure 16:
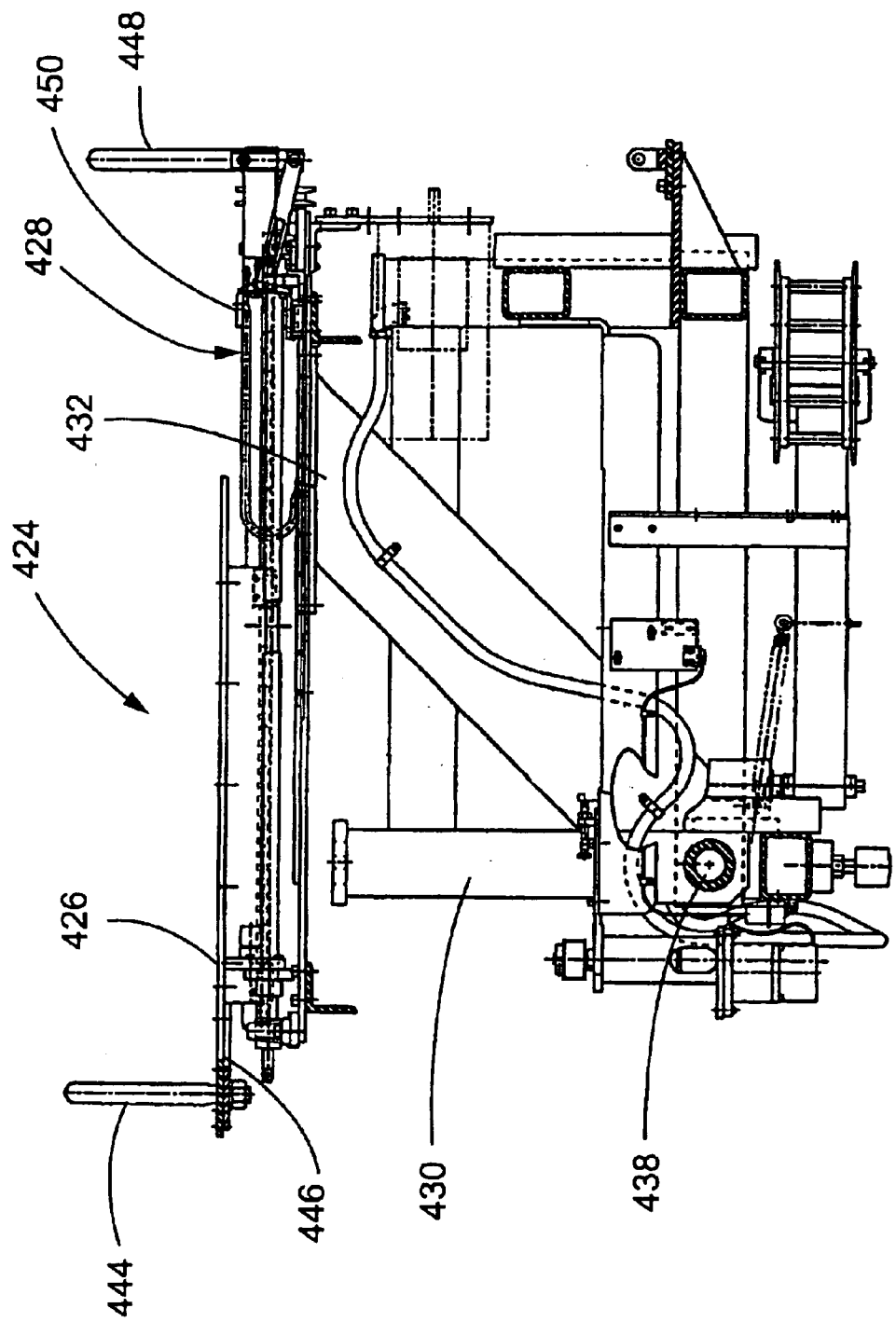
FIG. 16 is a sectional view of the tire handling system of FIG. 14 taken along line 16—16 in FIG. 15.
Figure 17:
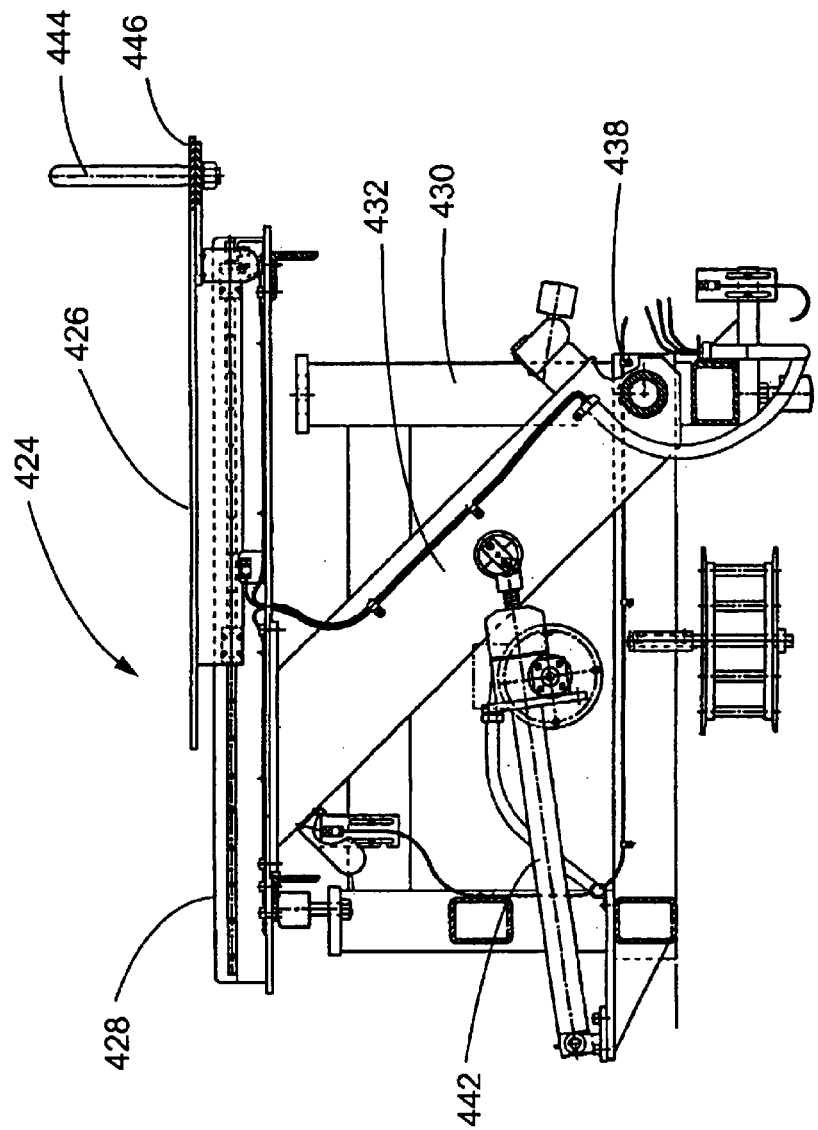
FIG. 17 is a sectional view of the tire handling system of FIG. 14 taken along line 17—17 in FIG. 15.
Figure 18:
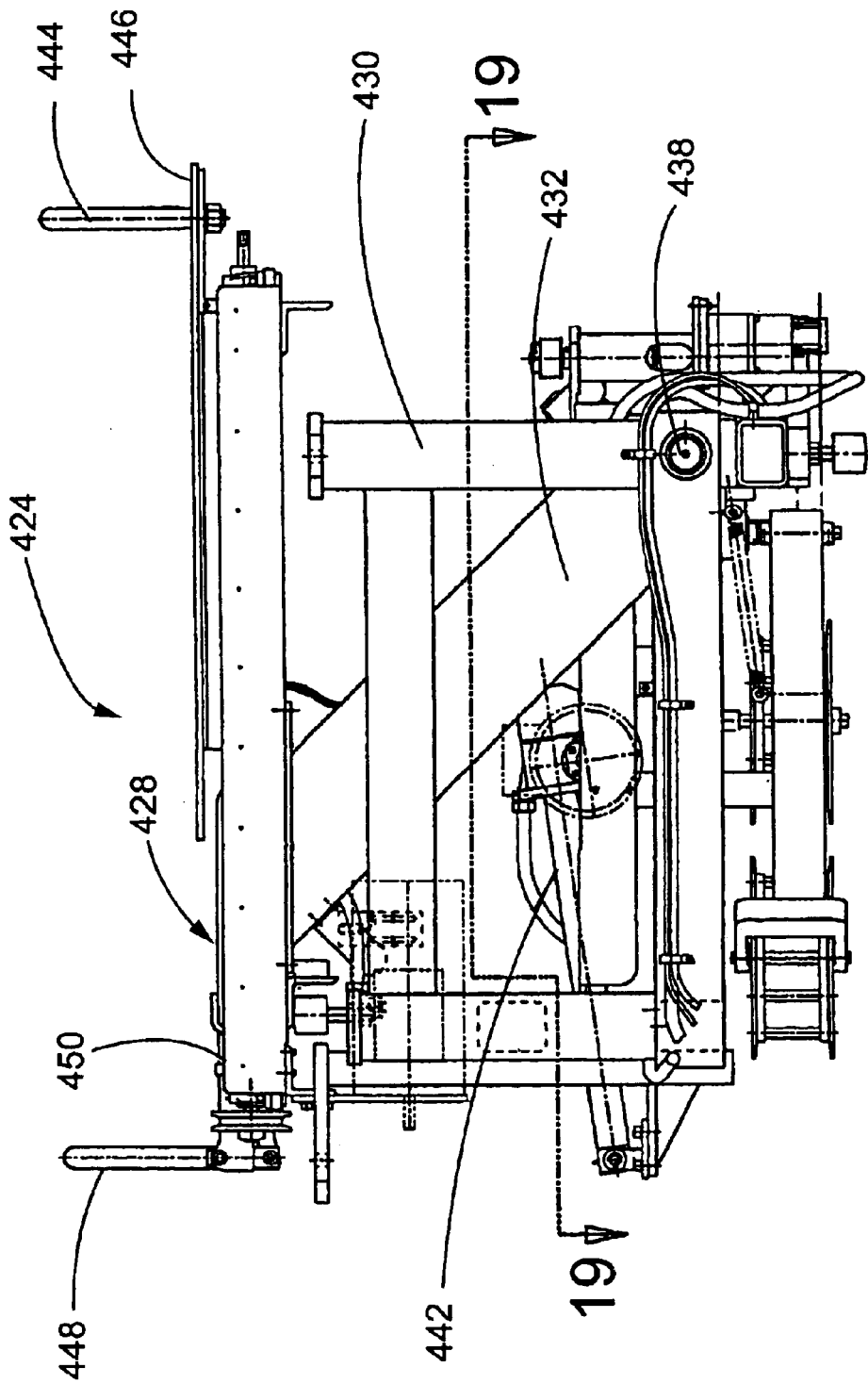
FIG. 18 is a side elevation view of the tire handling system of FIG. 14 taken in the plane of line 18—18 in FIG. 15.
Figure 19:
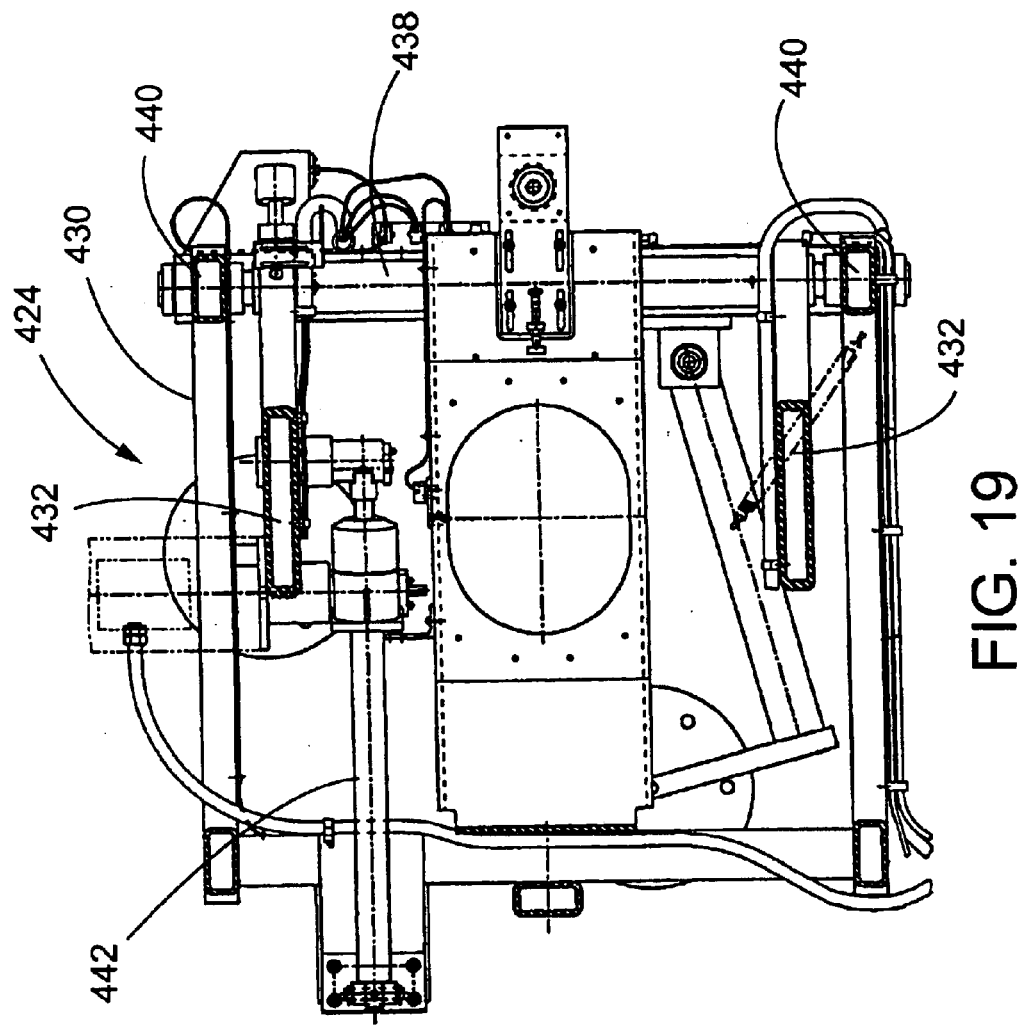
FIG. 19 is a sectional view of the tire handling system of FIG. 14 taken along the line 19—19 in FIG. 18.

An exemplary embodiment of a tire handling system is shown in greater detail in FIGS. 14–19. In the exemplary embodiment, the tire support plate 426 is mounted on a carriage 428 that is, in turn, connected to a pivot frame 430 via a pair of arms 432 as shown in FIGS. 16–18. In this instance, the carriage 428 (see, e.g., FIGS. 14 and 15) comprises a pair of parallel support members 434 which are interconnected by a pair of laterally extending braces 436 which extend between the support members adjacent the ends thereof. When the support plate 426 is in the loading position, the support members 434 are angled slightly rearward from a vertically upstanding position as shown in FIGS. 8 and 10. The support members 434 are horizontal and extend in front-to-back relation to the vacuum chamber 412 when the support plate 426 is in the inspection position. Each arm 432 is connected to a respective one of the support members 434 and connects the carriage to a shaft 438 (FIGS. 15, 16 and 19) which is rotatably supported by the pivot frame 430 and defines the pivot around which the arms 432 and carriage 428 rotate. The shaft 438 extends laterally between a pair of legs 440 arranged adjacent a front end of the pivot frame 430 as shown in FIG. 19.

The pivotal loading assembly 424 also includes a linear actuator 442 which is pivotally connected at one end to the pivot frame 430 and at the opposing end to one of the arms 432 (see, e.g., FIGS. 17 and 19). Thus, extension and retraction of the linear actuator 442 rotates the shaft 438 and arms 432 relative to the pivot frame 430 and thereby pivots the carriage 428 and support plate 426 between the loading and inspection positions. The low front lip 422 of the vacuum chamber 412 facilitates the pivotal movement of the carriage 428 and support plate 426 by presenting a barrier of minimal height that the carriage and support plate must clear. Since the carriage 428 and support plate 426 are substantially vertical when in the loading position, they consume a relatively small amount of floor space particularly as compared to horizontal conveyor type loading systems. The required floor space is also minimized by the fact that the tire is loaded into and unloaded from the vacuum chamber 412 in the same position.

For supporting a tire as it is loaded onto the plate, the support plate 426 includes a pair of laterally spaced posts 444. The posts 444 are arranged adjacent the lower end 446 of the support plate 426 and are spaced apart a sufficient distance to support tires of different diameter. Since the support plate 426 is arranged substantially vertically in the loading position and the posts 444 are at the lower end 446 of the plate, a tire only has to be lifted a short distance to be loaded onto the support plate.

The tire handling system automatically centers the tire relative to the vacuum chamber 412 and thereby, the shearography camera by taking advantage of the circular configuration of the tire. With respect to the lateral direction or axis, the posts 444 on the support plate 426 can act as the centering mechanism. In particular, the posts 444 are arranged on the support plate 426 such that, when the plate is in the inspection position, the posts 444 are positioned on either side of and spaced equidistant from the center of pressure chamber 412. Accordingly, no matter what diameter tire is placed on the posts 44, it will be centered laterally relative to the chamber and camera when the support plate 426 is pivoted into the inspection position.

Centering of the tire in the front-to-back direction or axis of the vacuum chamber is accomplished via the tire support plate 426 and a tire sensing arm 448 which are movable towards each other so as to clamp a tire therebetween. As shown, for example, in FIGS. 14, 16, 18, prior to the start of a centering/loading operation, the sensing arm 448 is arranged adjacent an upper end 450 of the carriage 428 in lateral alignment with one of the tire support posts 444. Moreover, the sensing arm 448 and posts 444 are spaced equidistant from the center of the carriage 428. The sensing arm 448 is slidable longitudinally along the carriage 428 on a rail 452 (FIG. 14) provided on one of the support members 434. Likewise, the support plate 426 is slidable longitudinally along the carriage 428 on corresponding rails 454 (FIG. 15) provided on the support members 434.

Figure 14:
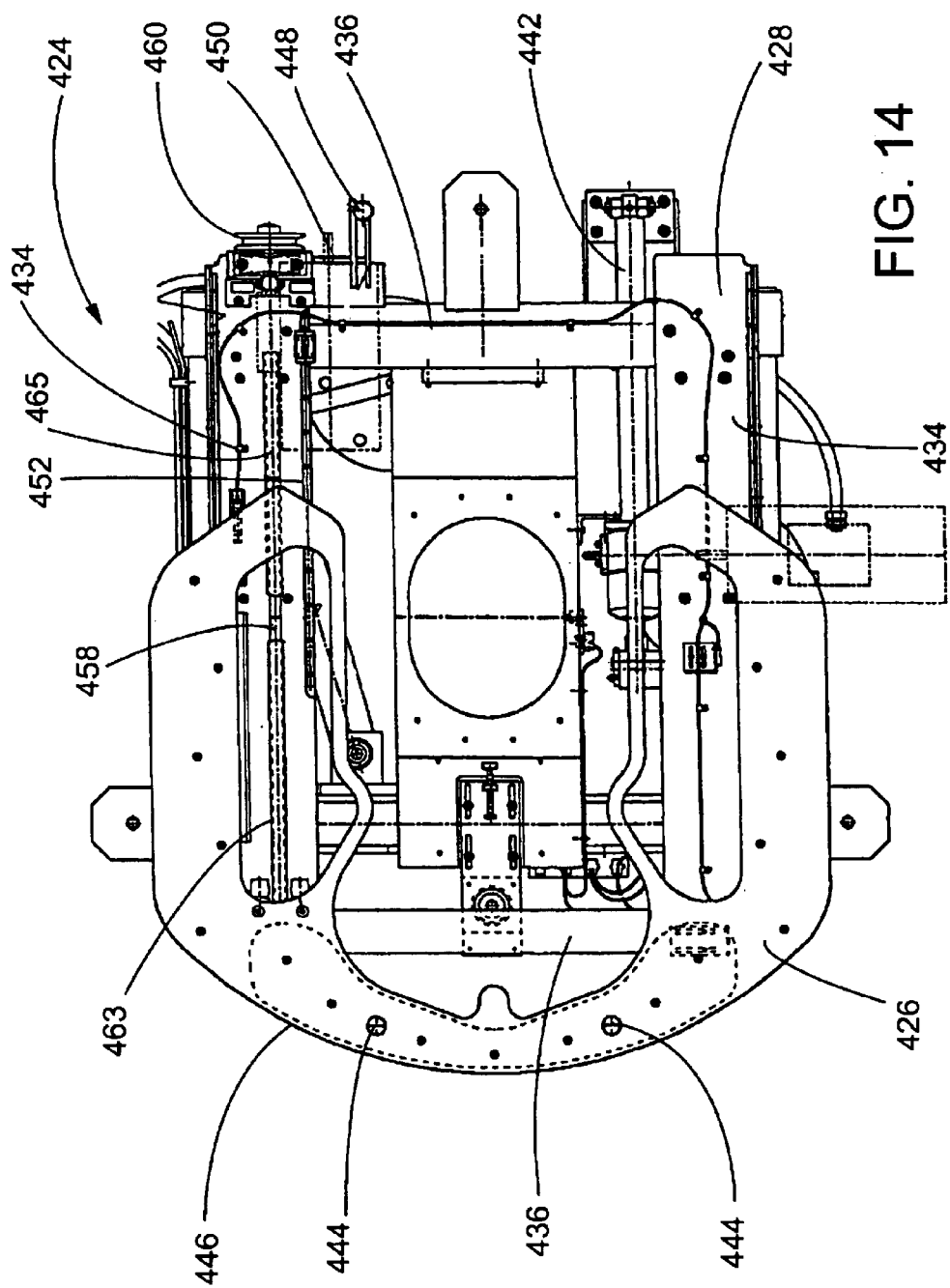
FIG. 14 is a top plan view of an exemplary embodiment of a tire handling system for the shearography testing apparatus of FIG. 8 in the inspection position.
Figure 15:
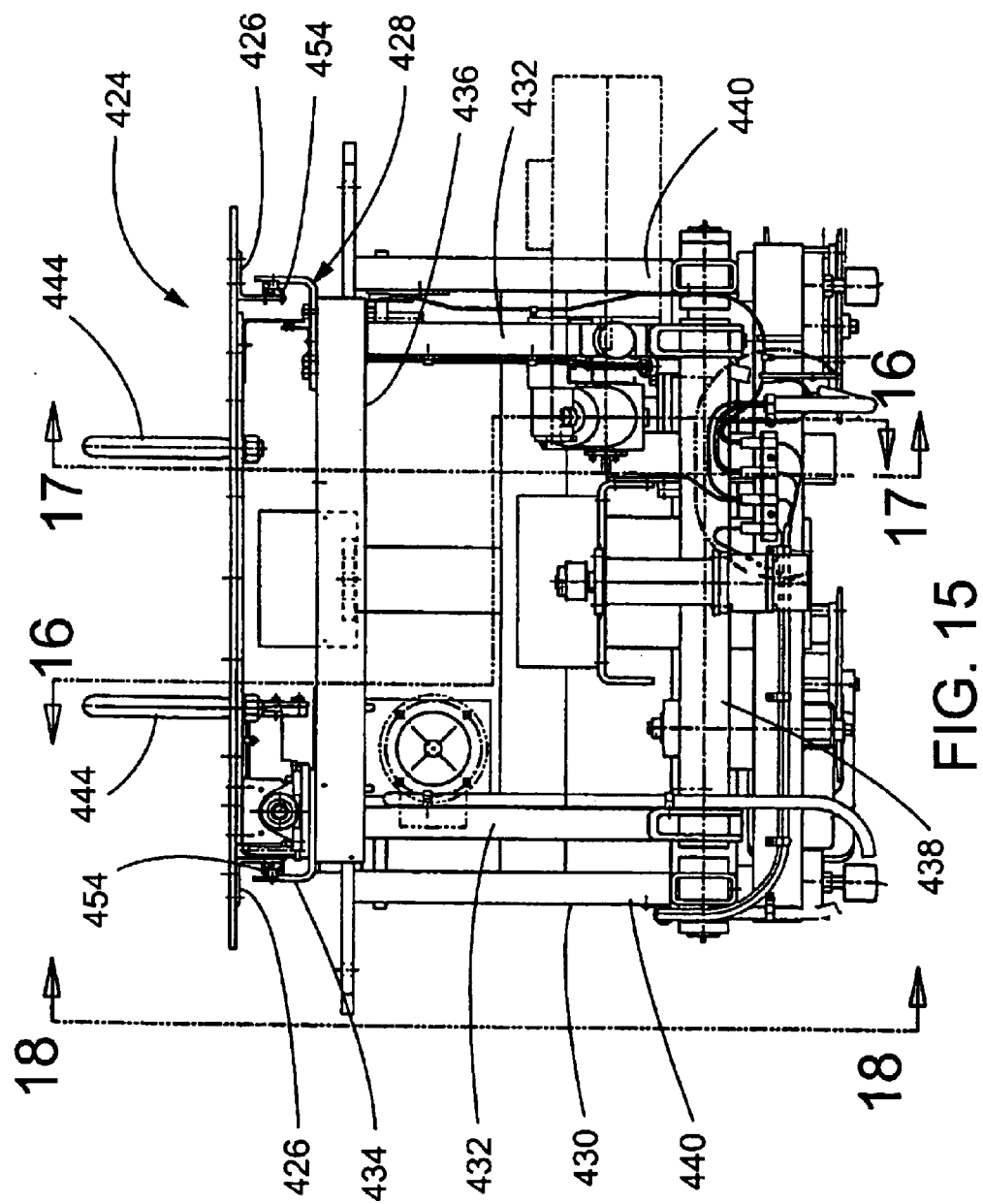
FIG. 15 is a front elevation view of the tire handling system of FIG. 14 in the inspection position.

The support plate 426 and sensing arm 448 are driven along the carriage 428 via, in this case, a screw drive mechanism. The lead screw 458 of the drive mechanism extends longitudinally relative to the carriage 428 parallel to the rails and is supported at either end of the carriage by suitable bearings as shown in FIG. 14. A motor 460 is arranged at the upper end of the carriage 428 for rotating the lead screw 458. The support plate 426 is coupled via a nut to a lower portion 463 of the lead screw 458 while the sensing arm 448 is coupled via a nut to an upper portion 465 of the lead screw. The lower and upper portions 463, 465 of the lead screw 458 are threaded identically, but in opposing directions. Thus, rotation of the lead screw 458 moves the support plate 426 and the sensing arm 448 in opposite directions at the same speed.

During a tire loading operation, the motor 460 turns the lead screw 458 such that the tire support plate 426 moves towards the upper end of the carriage 428 while the sensing arm 448 moves toward the lower end so that a tire resting on the support posts 444 ends up clamped between the support posts and the sensing arm. The sensing arm 448 is pivotally supported such that when the sensing arm contacts the outer surface of the tire, it is pushed past a centered position. This pivotal movement of the sensing arm 448 trips a limit switch that shuts off the screw drive motor 460. Since the support plate 426 and the sensing arm 448 have moved equal distance along the carriage 428 and they began the sequence laterally aligned and spaced equidistant from the center of the carriage, the tire is in centered position relative to the carriage when the sensing arm 448 contacts the tire. Thus, by configuring the carriage 428 such that it is centered relative to the vacuum chamber 414 when the carriage pivots into the inspection position, the tire is also centered relative to the camera.

As will be appreciated, the centering sequence can take place at any time prior to the start of the inspection cycle. For example, in order to reduce the time required for the loading operation, the centering sequence can occur at the same time the carriage is pivoting from the loading to the inspection position. However, the centering sequence can also occur either before or after the carriage is pivoted.

Figure 20:
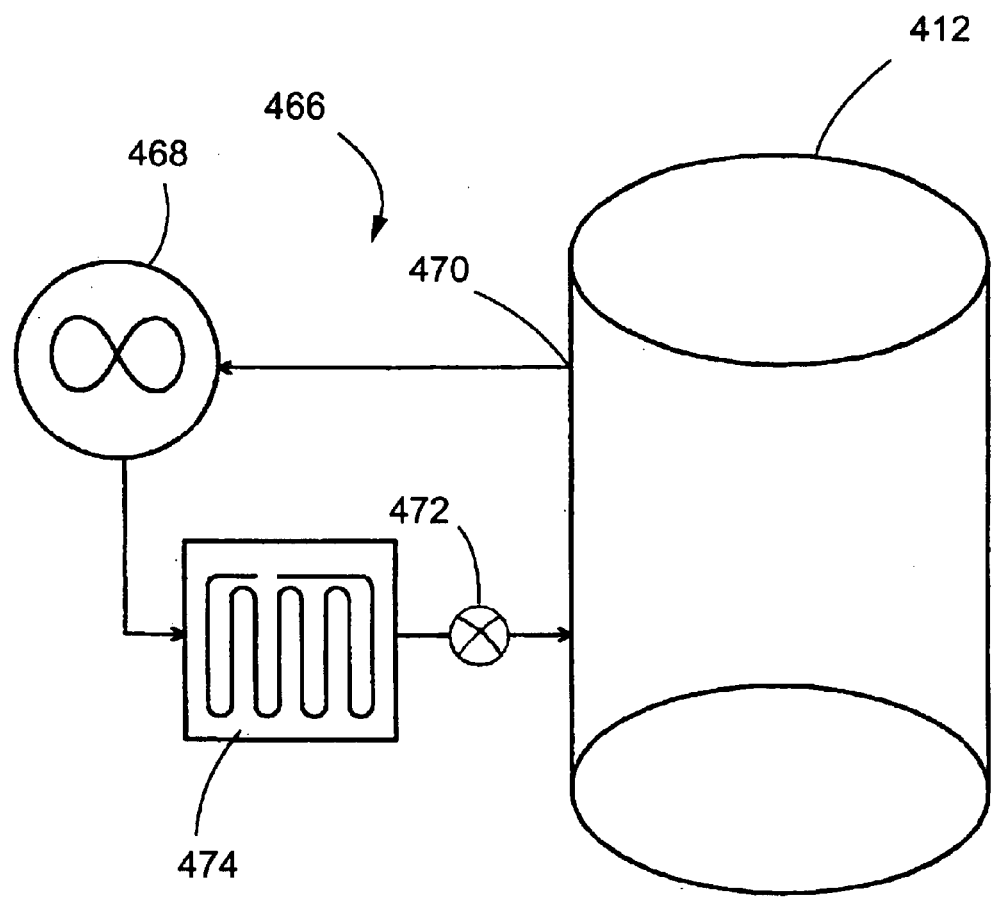
FIG. 20 is a schematic diagram of an exemplary air handling system for the shearography testing apparatus of FIG. 8.

For subjecting the tire or other test object to a vacuum cycle (i.e., depressurization and pressurization), the illustrated shearography testing apparatus 410 includes an air handling system 446. The air handling system 446 includes, in this case, a vacuum pump 468 which draws air through an outlet 470 in the wall of the vacuum chamber 412 as shown in FIG. 20. An inlet valve 472 is also provided in the wall of the vacuum chamber 412. During the depressurization portion of the vacuum cycle, the inlet valve 472 is closed and the vacuum pump 468 draws air out of the vacuum chamber 412. When the vacuum chamber 412 is closed, this reduces the pressure in the vacuum chamber and stresses the tire. While the tire is stressed, the shearographic camera 230 takes a series of interference images of the tire. Once a desired number of interference images have been taken, the pressurization portion of the vacuum cycle begins. During pressurization of the chamber, the vacuum pump 468 continues to operate, but the inlet valve 472 is open. Thus, air is circulated through the closed vacuum chamber 412 through the air inlet and outlet. This returns the vacuum chamber to a normal atmospheric pressure and returns the tire to an unstressed state. The camera 230 can then be rotated to the next tire sector and the vacuum cycle repeated.

Preferably, the air between the test object and the shearography camera should have a uniform and consistent density during the vacuum stressing cycle. Applicants have found that if the relative humidity is high during the vacuum cycle, a fog-like ambient condition occurs in the vacuum chamber 412. This causes refraction and reflection of the light used in the shearographic process substantially reducing the quality of the interference images taken by the shearography camera 230. The fog-like condition is produced because the reduction in ambient pressure in the vacuum chamber 412 during the vacuum cycle yields a corresponding reduction in the ambient temperature of the air and any water held in suspension in the air. As the air and water temperature is reduced, water comes out of suspension producing the fog.

In order to prevent the fog-like condition from developing, the shearography testing apparatus 410 of the present invention can include a mechanism in communication with the interior of the vacuum chamber 412 which can reduce the relative humidity in the vacuum chamber during the vacuum cycle. For example, the air handling system 466 can be adapted to heat the air drawn into the vacuum chamber 412 through the inlet valve 472, thereby warming up the air inside the vacuum chamber. This counters the heat that is removed as a result of the pressure reduction allowing the air to hold more water. Thus, the relative humidity is reduced and the water vapor remains in suspension. As shown in FIG. 20, one way in which this can be accomplished is by providing a heating element 474 at the air inlet to the vacuum chamber 412. The air drawn into the vacuum chamber 412 through the inlet passes over the heating element 474 and is thereby heated.

Heating of the air can be accomplished more efficiently by using the heat generated by operation of the vacuum pump 468. In particular, a duct can be provided which takes the air from the exhaust side of the vacuum pump 468, which has been heated by operation of the vacuum pump, and directs it over the heating element 474. The heated air is then directed back into the vacuum chamber 412 through the air inlet valve 472. The heating element 474 can be manually actuated so that it can be activated when desired such as during high humidity conditions. Additionally, the heating element 474 can be tied to a sensor which actuates the heating element when the relative humidity exceeds a predetermined value. To help prevent against overheating, the heating element 474 can be adapted such that it shuts off when the vacuum pump 468 is not running. While a heating element 474 at the inlet to the vacuum chamber 412 is disclosed, it will be appreciated that the heating element can be arranged in any suitable location which enables it to heating the air in the vacuum chamber 412 such as inside the vacuum chamber itself. Moreover, any suitable type of heating mechanism can be used.

Alternatively, instead of using a heating element, the air handling system 466 can include a dehumidifier for removing water vapor from the air in the vacuum chamber. The dehumidifier includes cooling plates which cool the air as it is circulated during the pressurization portion of the vacuum cycle. This causes the water vapor to come out of suspension on the cooling plates. The air can then be allowed to warm back up producing a lower relative humidity and drawn back into the vacuum chamber 412.

All of the references cited herein, including patents, patent applications, and publications, are hereby incorporated in their entireties by reference.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the claims.

What is claimed is:

1. An apparatus for performing electronic shearography on a tire, the apparatus comprising:

a pressure chamber having a door movable between open and closed positions, an air handling system in communication with the interior of the pressure chamber for changing the ambient pressure in the pressure chamber, the air handling system including a humidity reducing mechanism in communication with the interior of the pressure chamber and being selectively operable to reduce the relative humidity in the interior of the pressure chamber, a shearography camera arranged in the pressure chamber for taking an interference image of a tire, an image processor coupled to the shearography camera, the image processor being adapted to receive a plurality of sequential interference images from the shearography camera, produce a set of a plurality of sequential shearogram images of the tire from the interference images and produce an animation from the set of sequential shearogram images to represent dynamically changing stress states on a tire, archive memory for retaining data corresponding to the animation received from the image processor, the retained animation data being compressed in such a manner that the retained animation data includes only preselected individual shearogram images from the set of sequential shearogram images and less than all of the image data associated with each preselected individual shearogram image, and a tire loading system for loading a tire into the pressure chamber through the pressure chamber door, the tire loading system including a tire support plate which is pivotable between a loading position wherein the tire support plate is arranged to support a tire in a generally vertical position substantially outside of the pressure chamber and an inspection position wherein the support plate is arranged to support a tire in a substantially horizontal position in the interior of the pressure chamber, the support plate being movable along a carriage which is adapted to automatically center a tire supported on the support plate relative to the shearography camera.

2. The apparatus according to claim 1 wherein the preselected individual shearogram images comprise shearogram images taken at a preselected regular interval from the set of sequential shearogram images.

3. The apparatus according to claim 1 wherein the preselected individual shearogram images in the retained animation data are shrunk in size using a pixel averaging technique.

4. The apparatus according to claim 1 wherein each shearogram image comprises a plurality of individual pieces of image data and the retained data is compressed in such a manner that it only includes individual pieces of image data which have changed by more than a predetermined amount from the proceeding shearogram image in the set of sequential shearogram images.

5. The apparatus according to claim 1 wherein the tire support plate has a center portion which is substantially open.

6. The apparatus according to claim 1 wherein the tire loading system includes a pivot frame arranged in the pressure chamber and a pivot arm extending between the pivot frame and the carriage.

7. The apparatus according to claim 6 wherein the pressure chamber door is defined by an upper portion of the pressure chamber which is pivotally mounted on a lower portion of the pressure chamber and wherein a joint separates the upper and lower portions of the pressure chamber, the joint extending at an angle upward from a front portion of the pressure chamber adjacent which the tire support plate is arranged in the loading position toward an opposing rear portion of the pressure chamber.

8. The apparatus according to claim 1 wherein the tire support plate includes a pair of spaced apart support posts arranged adjacent a lower end of the support plate and adjacent a lower end of the carriage.

9. The apparatus according to claim 8 wherein the tire loading system includes a sensing arm arranged adjacent an upper end of the carriage opposite the support posts and a centering drive mechanism, the centering drive mechanism being operable to move the sensing arm and the support posts in opposing directions along the carriage equal distances at equal speeds and the sensing arm being operable to stop operation of the drive mechanism when the sensing arm contacts a tire supported on the support plate.

10. The apparatus according to claim 1 wherein the humidity reducing mechanism comprises a heating element operable to provide heated air to the interior of the pressure chamber.

11. The apparatus according to claim 10 wherein the heating element is arranged outside of the pressure chamber adjacent an inlet in the pressure chamber through which the air handling system delivers air into the interior of the pressure chamber.

12. An apparatus for performing electronic shearography on a test object, the apparatus comprising:
a shearography camera for taking an interference image of the test object,
an image processor coupled to the shearography camera, the image processor being adapted to receive a plurality of sequential interference images from the shearography camera, produce a set of a plurality of sequential shearogram images of the test object from the interference images and produce an animation from the set of sequential shearogram images to represent dynamically changing stress states on the test object,
a display coupled to the image processor for providing visualization of the animation of the set of sequential shearogram images, and
archive memory for retaining data corresponding to the animation, the retained animation data being compressed in such a manner that the retained animation data includes only preselected individual shearogram images from the set of sequential shearogram images and less than all of the image data associated with each preselected individual shearogram image.

13. The apparatus according to claim 12 wherein the preselected individual shearogram images comprise shearogram images taken at a preselected regular interval from the set of sequential shearogram images.

14. The apparatus according to claim 12 wherein the preselected individual shearogram images in the retained animation data are shrunk in size using a pixel averaging technique.

15. The apparatus according to claim 12 wherein each shearogram image comprises a plurality of individual pieces of image data and the retained data is compressed in such a manner that it only includes individual pieces of image data which have changed by more than a predetermined amount from the proceeding shearogram image in the set of sequential shearogram images.

16. The apparatus according to claim 12 further including a data processor adapted to compress the retained animation data.

17. The apparatus according to claim 16 wherein the data processor is a computer.

18. The apparatus according to claim 12 wherein the image processor is adapted to produce a plurality of sets of sequential shearogram images and produce an animation from each set of sequential shearogram images, each set of sequential shearogram images being representative of a substantially different section of the test object.

19. The apparatus according to claim 18 wherein the archive memory is adapted to retain data corresponding to each animation.

20. The apparatus according to claim 12 wherein the retained animation data includes an identifier.

21. The apparatus according to claim 12 wherein the retained animation data includes an index associating the retained animation data with the identifier.

22. The apparatus according to claim 12 wherein the retained animation data is in the form of an animated graphics file.

23. The apparatus according to claim 12 further including a pressure chamber having a door movable between open and closed positions and the shearography camera being arranged in the pressure chamber.

24. The apparatus according to claim 23 further including a tire loading system for loading a tire into the pressure chamber through the pressure chamber door, the tire loading system including a tire support plate which is pivotable between a loading position wherein the tire support plate is arranged to support a tire in a generally vertical position substantially outside of the pressure chamber and an inspection position wherein the support plate is arranged to support a tire in a substantially horizontal position in the interior of the pressure chamber, the support plate being movable along a carriage which is adapted to automatically center a tire supported on the support plate relative to the shearography camera.

25. The apparatus according to claim 24 wherein the tire support plate has a center portion which is substantially open.

26. The apparatus according to claim 24 wherein the tire loading system includes a pivot frame arranged in the pressure chamber and a pivot arm extending between the pivot frame and the carriage.

27. The apparatus according to claim 26 wherein the pressure chamber door is defined by an upper portion of the pressure chamber which is pivotally mounted on a lower portion of the pressure chamber and wherein a joint separates the upper and lower portions of the pressure chamber, the joint extending at an angle upward from a front portion of the pressure chamber adjacent which the tire support plate is arranged in the loading position toward an opposing rear portion of the pressure chamber.

28. The apparatus according to claim 24 wherein the tire support plate includes a pair of spaced apart support posts arranged adjacent a lower end of the support plate and adjacent a lower end of the carriage.

29. The apparatus according to claim 28 wherein the tire loading system includes a sensing arm arranged adjacent an upper end of the carriage opposite the support posts and a centering drive mechanism, the centering drive mechanism being operable to move the sensing arm and the support posts in opposing directions along the carriage equal distances at equal speeds and the sensing arm being operable to stop operation of the drive mechanism when the sensing arm contacts a tire supported on the support plate.

30. The apparatus according to claim 23 further including an air handling system in communication with the interior of the pressure chamber for changing the ambient pressure in the pressure chamber, the air handling system including a humidity reducing mechanism in communication with the interior of the pressure chamber and being selectively operable to reduce the relative humidity in the interior of the pressure chamber.

31. The apparatus according to claim 30 wherein the humidity reducing mechanism comprises a heating element operable to provide heated air to the interior of the pressure chamber.

32. An apparatus for performing electronic shearography on a test object, the apparatus comprising:

a shearography camera for taking an interference image of the test object, an image processor coupled to the shearography camera, the image processor being adapted to receive a plurality of sequential interference images from the shearography camera, produce a set of a plurality of sequential shearogram images of the test object from the interference images wherein each shearogram image comprises a plurality of individual pieces of image data and produce an animation from the set of sequential shearogram images to represent dynamically changing stress states on the test object, a display coupled to the image processor for providing visualization of the animation of the set of sequential shearogram images, and archive memory for retaining data corresponding to the animation, the retained animation data being compressed in such a manner that it only includes individual pieces of image data which have changed by more than a predetermined amount from the preceding shearogram image in the set of sequential shearogram images.

33. The apparatus according to claim 32 wherein the individual pieces of image data comprise pixel values.

34. The apparatus according to claim 33 wherein the predetermined amount is a change in the pixel value which is not discernable by the human eye in an animation.

35. The apparatus according to claim 32 further including a data processor adapted to compress the retained animation data.

36. The apparatus according to claim 35 wherein the data processor is a computer.

37. The apparatus according to claim 32 wherein the image processor is adapted to produce a plurality of sets of sequential shearogram images and produce an animation from each set of sequential shearogram images, each set of sequential shearogram images being representative of a substantially different section of the test object.

38. The apparatus according to claim 37 wherein the archive memory is adapted to retain data corresponding to each animation.

39. The apparatus according to claim 32 wherein the retained animation data includes an identifier.

40. The apparatus according to claim 32 wherein the retained animation data includes an index associating the retained animation data with the identifier.

41. The apparatus according to claim 32 wherein the retained animation data is in the form of an animated graphics file.

42. The apparatus according to claim 32 wherein the retained animation data is compressed using a LZW compression technique.

43. The apparatus according to claim 32 further including a pressure chamber having a door movable between open and closed positions and the shearography camera being arranged in the pressure chamber.

44. The apparatus according to claim 43 further including a tire loading system for loading a tire into the pressure chamber through the pressure chamber door, the tire loading system including a tire support plate which is pivotable between a loading position wherein the tire support plate is arranged to support a tire in a generally vertical position substantially outside of the pressure chamber and an inspection position wherein the support plate is arranged to support a tire in a substantially horizontal position in the interior of the pressure chamber, the support plate being movable along a carriage which is adapted to automatically center a tire supported on the support plate relative to the shearography camera.

45. The apparatus according to claim 44 wherein the tire support plate has a center portion which is substantially open.

46. The apparatus according to claim 44 wherein the tire loading system includes a pivot frame arranged in the pressure chamber and a pivot arm extending between the pivot frame and the carriage.

47. The apparatus according to claim 44 wherein the pressure chamber door is defined by an upper portion of the pressure chamber which is pivotally mounted on a lower portion of the pressure chamber and wherein a joint separates the upper and lower portions of the pressure chamber, the joint extending at an angle upward from a front portion of the pressure chamber adjacent which the tire support plate is arranged in the loading position toward an opposing rear portion of the pressure chamber.

48. The apparatus according to claim 44 wherein the tire support plate includes a pair of spaced apart support posts arranged adjacent a lower end of the support plate and adjacent a lower end of the carriage.

49. The apparatus according to claim 48 wherein the tire loading system includes a sensing arm arranged adjacent an upper end of the carriage opposite the support posts and a centering drive mechanism, the centering drive mechanism being operable to move the sensing arm and the support posts in opposing directions along the carriage equal distances at equal speeds and the sensing arm being operable to stop operation of the drive mechanism when the sensing arm contacts a tire supported on the support plate.

50. The apparatus according to claim 43 further including an air handling system in communication with the interior of the pressure chamber for changing the ambient pressure in the pressure chamber, the air handling system including a humidity reducing mechanism in communication with the interior of the pressure chamber and being selectively operable to reduce the relative humidity in the interior of the pressure chamber.

51. The apparatus according to claim 50 wherein the humidity reducing mechanism comprises a heating element operable to provided heated air to the interior of the pressure chamber.

52. An apparatus for performing electronic shearography on a test object, the apparatus comprising:

a pressure chamber within which the test object is supportable, a shearography camera arranged in the pressure chamber for taking an interference image of the test object, and an air handling system in communication with the interior of the pressure chamber for changing the ambient pressure in the pressure chamber, the air handling system including a humidity reducing mechanism in communication with the interior of the pressure chamber and being selectively operable to reduce the relative humidity in the interior of the pressure chamber.

53. The apparatus according to claim 52 wherein the humidity reducing mechanism comprises a heating element operable to provide heated air to the interior of the pressure chamber.

54. The apparatus according to claim 53 wherein the heating element is arranged outside of the pressure chamber adjacent an inlet in the pressure chamber through which the air handling system delivers air into the interior of the pressure chamber.

55. The apparatus according to claim 54 wherein the air handling system includes a vacuum pump in communication with the interior of the pressure chamber and operable to draw air of the pressure chamber through an outlet and draw air into the pressure chamber through the inlet.

56. The apparatus according to claim 55 wherein the heating element is arranged to heat air from an outlet side of the vacuum pump which is drawn into the pressure chamber through the inlet.

57. The apparatus according to claim 52 further including a tire loading system for loading a tire into the pressure chamber through the pressure chamber door, the tire loading system including a tire support plate which is pivotable between a loading position wherein the tire support plate is arranged to support a tire in a generally vertical position substantially outside of the pressure chamber and an inspection position wherein the support plate is arranged to support a tire in a substantially horizontal position in the interior of the pressure chamber, the support plate being movable along a carriage which is adapted to automatically center a tire supported on the support plate relative to the shearography camera.

58. The apparatus according to claim 57 wherein the tire support plate has a center portion which is substantially open.

59. The apparatus according to claim 57 wherein the tire loading system includes a pivot frame arranged in the pressure chamber and a pivot arm extending between the pivot frame and the carriage.

60. The apparatus according to claim 59 wherein the pressure chamber door is defined by an upper portion of the pressure chamber which is pivotally mounted on a lower portion of the pressure chamber and wherein a joint separates the upper and lower portions of the pressure chamber, the joint extending at an angle upward from a front portion of the pressure chamber adjacent which the tire support plate is arranged in the loading position toward an opposing rear portion of the pressure chamber.

61. The apparatus according to claim 57 wherein the tire support plate includes a pair of spaced apart support posts arranged adjacent a lower end of the support plate and adjacent a lower end of the carriage.

62. The apparatus according to claim 61 wherein the tire loading system includes a sensing arm arranged adjacent an upper end of the carriage opposite the support posts and a centering drive mechanism, the centering drive mechanism being operable to move the sensing arm and the support posts in opposing directions along the carriage equal distances at equal speeds and the sensing arm being operable to stop operation of the drive mechanism when the sensing arm contacts a tire supported on the support plate.

63. The apparatus according to claim 52 further including an image processor coupled to the shearography camera, the image processor being adapted to receive a plurality of sequential interference images from the shearography camera, produce a set of a plurality of sequential shearogram images of the tire from the interference images and produce an animation from the set of sequential shearogram images to represent dynamically changing stress states on the test object.

64. The apparatus according to claim 63 further including an archive memory for retaining data corresponding to the animation, the retained animation data being compressed in such a manner that the retained animation data includes only preselected individual shearogram images from the set of sequential shearogram images and less than all of the image data associated with each preselected individual shearogram image.

65. A method for analyzing a test object comprising:
(a) taking an interference image of a test object,
(b) comparing the interference image with a baseline interference image to produce a shearogram image,
(c) repeating steps (a) and (b) at varying stress levels to produce set of a plurality of sequential shearogram images
(d) selecting individual shearogram images from the set of sequential shearogram images to produce an archive set of sequential shearogram images, each of the selected shearogram images comprising a set of individual pieces of image data;
(e) compressing the image data associated with each of the selected individual images to produce an animated graphics file, the animated graphics file being compressed in such a manner that individual pieces of image data which have changed less than a predetermined amount from the preceding shearogram image in the archive set of sequential shearogram images are discarded;
(f) storing the animated graphics file.

66. The method according to claim 65 wherein the individual pieces of image data comprise pixel values.

67. The method according to claim 66 wherein the predetermined amount is a change in the pixel value which is not discernible by the human eye in an animation.

68. The method according to claim 65 further including the step of assigning an identifier to the test object.

69. The method according to claim 68 further including the step of creating an index file associating the test object identifier with the animated graphics file.

70. The method according to claim 65 wherein the step of selecting individual shearogram images for the archive set of sequential shearogram images is performed by taking shearogram images at a preselected regular interval from the set of sequential shearogram images.

71. The method according to claim 65 further including the step of shrinking the size of each of the selected shearogram images prior to compressing the image data.

72. The method according to claim 65 further including the step of displaying the animated graphics file at a frame rate fast enough to generate an animation representative of dynamically changing stress states on the test object.

73. The method according to claim 72 further including the step of displaying the set of plurality of sequential shearogram images at a frame rate fast enough to generate an animation representative of dynamically changing stress states on the test object.

74. The method according to claim 73 wherein the set of plurality of sequential shearogram images are displayed at a faster frame rate than the animated graphics file.

* * * * *